United States Patent
Dudley

(10) Patent No.: US 10,518,847 B2
(45) Date of Patent: *Dec. 31, 2019

(54) UNMANNED MARINE VESSEL FOR NODE DEPLOYMENT AND RETRIEVAL

(71) Applicant: ION Geophysical Corporation, Houston, TX (US)

(72) Inventor: Timothy A. Dudley, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,270

(22) Filed: Jun. 8, 2018

(65) Prior Publication Data

US 2018/0346076 A1 Dec. 6, 2018

Related U.S. Application Data

(63) Continuation of application No. 15/410,038, filed on Jan. 19, 2017, now Pat. No. 10,005,523.

(Continued)

(51) Int. Cl.
*B63B 21/62* (2006.01)
*B63B 21/08* (2006.01)
(Continued)

(52) U.S. Cl.
CPC .............. *B63B 21/62* (2013.01); *B63B 21/08* (2013.01); *B63B 21/16* (2013.01); *B63H 25/04* (2013.01);
(Continued)

(58) Field of Classification Search
CPC ......... B63B 21/04; B63B 21/08; B63B 21/16; B63B 21/56; B63B 21/58; B63B 21/62;
(Continued)

(56) References Cited

U.S. PATENT DOCUMENTS

| 4,658,384 A | 4/1987 | Dragoset, Jr. et al. |
| 5,490,831 A | 2/1996 | Meyers et al. |

(Continued)

FOREIGN PATENT DOCUMENTS

| WO | 9934238 A1 | 7/1999 |
| WO | 0067046 A1 | 11/2000 |

(Continued)

OTHER PUBLICATIONS

International Search Report and Written Opinion dated Dec. 21, 2017 in connection with International Patent Application No. PCT/US2017/026611, 12 pages.

(Continued)

*Primary Examiner* — Lars A Olson
(74) *Attorney, Agent, or Firm* — Dorsey & Whitney LLP

(57) ABSTRACT

An unmanned seismic vessel system can include a hull system configured to provide buoyancy and a storage apparatus configured for storing one or more seismic nodes, each seismic node having at least one seismic sensor configured to acquire seismic data. A deployment system can be configured for deploying the seismic nodes from the storage apparatus to the water column, where the seismic data are responsive to a seismic wavefield, with a controller configured to operate the deployment system so that the seismic nodes are automatically deployed in a seismic array.

21 Claims, 16 Drawing Sheets

Related U.S. Application Data

(60) Provisional application No. 62/280,659, filed on Jan. 19, 2016.

(51) Int. Cl.
  *B63B 21/16* (2006.01)
  *G01V 1/38* (2006.01)
  *B63H 25/04* (2006.01)
  *G01V 1/16* (2006.01)
  *G01V 1/18* (2006.01)
  *B63B 35/00* (2006.01)

(52) U.S. Cl.
  CPC .............. *G01V 1/168* (2013.01); *G01V 1/186* (2013.01); *G01V 1/3808* (2013.01); *G01V 1/3843* (2013.01); *B63B 2035/008* (2013.01); *B63B 2211/02* (2013.01); *B63B 2213/00* (2013.01)

(58) Field of Classification Search
  CPC .......... G01V 1/16; G01V 1/38; G01V 1/3808; G01V 1/3817; G01V 1/3843
  USPC ................................ 114/248, 249, 254, 259
  See application file for complete search history.

(56) References Cited

U.S. PATENT DOCUMENTS

| | | |
|---|---|---|
| 6,028,817 A | 2/2000 | Ambs et al. |
| 6,285,956 B1 | 9/2001 | Bennett et al. |
| 6,606,958 B1 | 8/2003 | Bouyoucos |
| 6,779,475 B1 | 8/2004 | Crane et al. |
| 7,954,442 B2 | 6/2011 | Stottlemyer et al. |
| 8,075,226 B2 | 12/2011 | Fyffe et al. |
| 8,477,561 B2 | 7/2013 | Singh et al. |
| 8,824,239 B2 | 9/2014 | Welker et al. |
| 9,013,952 B2 | 4/2015 | Combee et al. |
| 9,400,338 B2 | 7/2016 | Coste et al. |
| 10,005,523 B2 * | 6/2018 | Dudley ................... B63B 21/62 |
| 2004/0013041 A1 | 1/2004 | Bouyoucos et al. |
| 2008/0267009 A1 | 10/2008 | Frivik et al. |
| 2009/0316524 A1 | 12/2009 | Tenghamn et al. |
| 2010/0170428 A1 | 7/2010 | Toennessen |
| 2010/0275831 A1 | 11/2010 | Stottlemyer et al. |
| 2012/0160143 A1 | 6/2012 | Bailey |
| 2014/0177387 A1 | 6/2014 | Brizard |
| 2014/0362661 A1 | 12/2014 | Welker et al. |
| 2017/0203815 A1 | 7/2017 | Dudley et al. |
| 2017/0293042 A1 | 10/2017 | Schneider et al. |
| 2019/0146113 A1 | 5/2019 | Dudley et al. |

FOREIGN PATENT DOCUMENTS

| | | |
|---|---|---|
| WO | 01/73477 A3 | 10/2001 |
| WO | 03/086850 A2 | 1/2007 |
| WO | 2012041844 A1 | 4/2012 |
| WO | 2015175646 A1 | 11/2015 |
| WO | 2015189415 A2 | 12/2015 |

OTHER PUBLICATIONS

Invitation to Pay Additional Fees and, Where Applicable, Protest Fee dated Apr. 3, 2017 in connection with International Patent Application No. PCT/US2017/014076, 10 pages.

The International Search Report and Written Opinion dated Jun. 12, 2017 in connection with International Patent Application No. PCT/US2017/014076, 20 pages.

Communication pursuant to Article 94(3) EPC dated Jul. 9, 2019 in connection with European Patent Application No. 17784422.2, 6 pages.

Office Action dated Aug. 22, 2019 in connection with Danish patent application No. PA201870676, 10 pages.

* cited by examiner

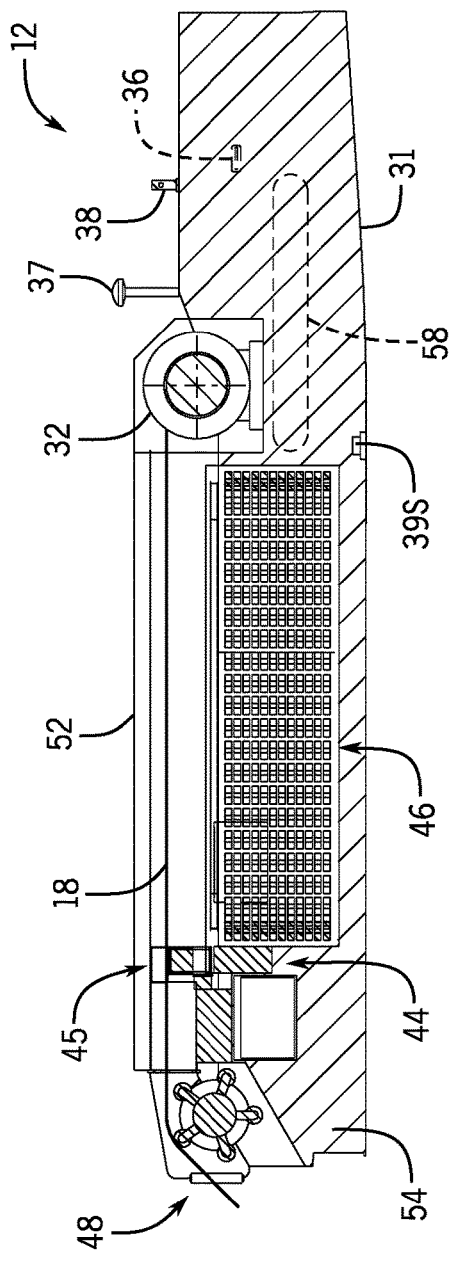
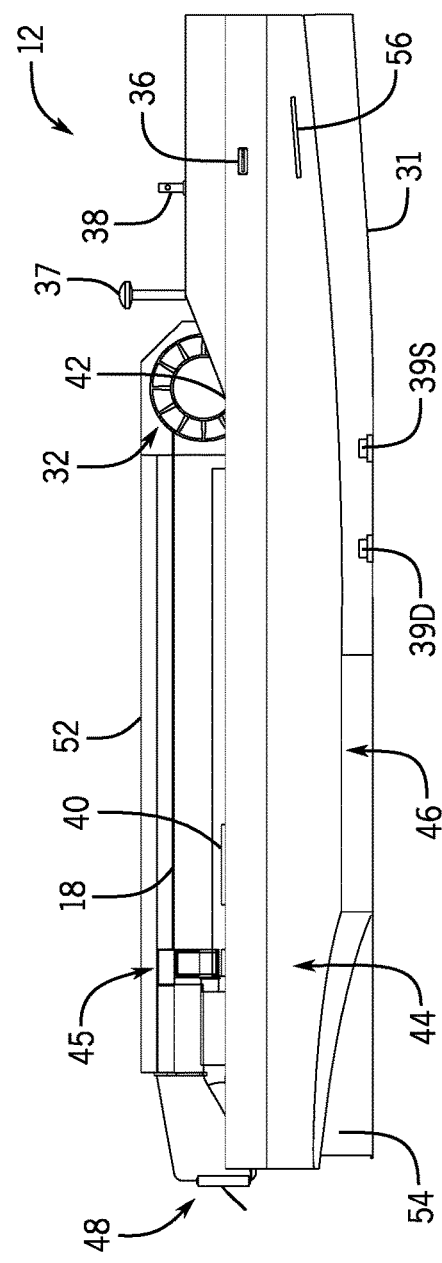
FIG. 5A
FIG. 5B

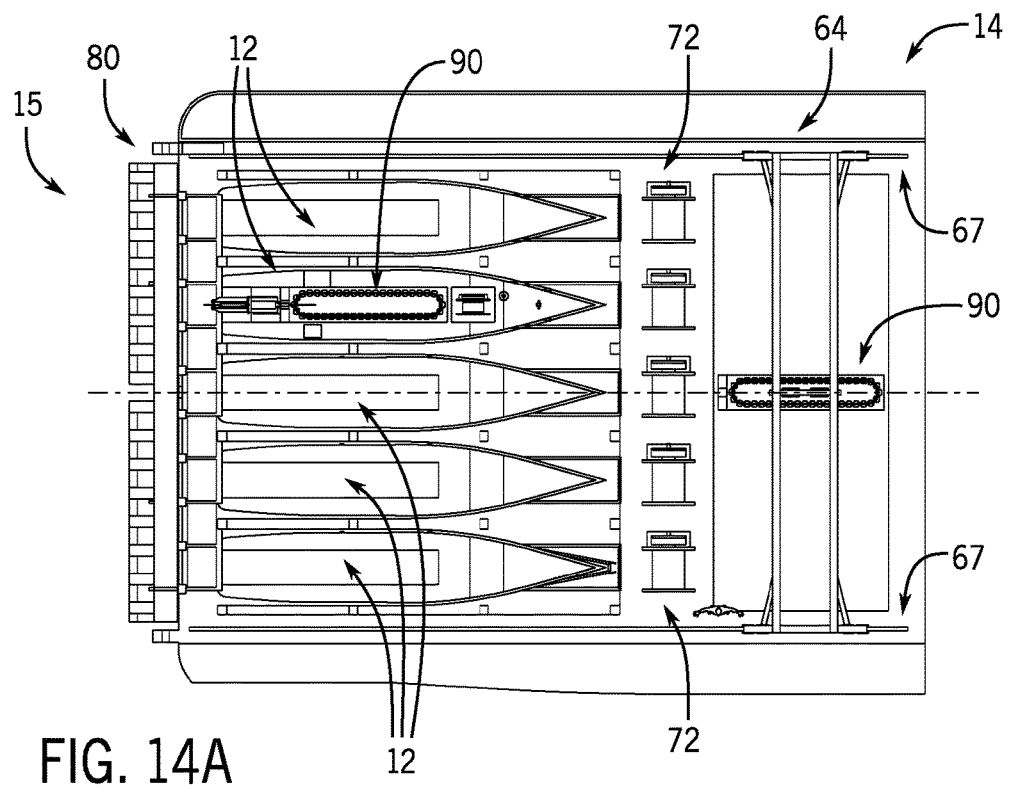
FIG. 14A
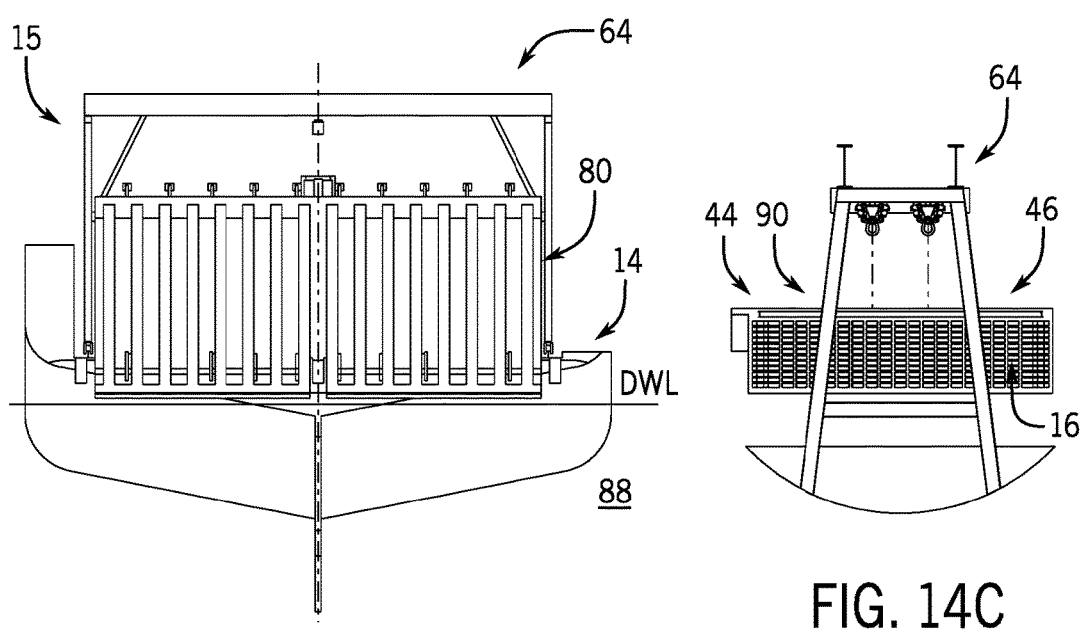
FIG. 14B
FIG. 14C

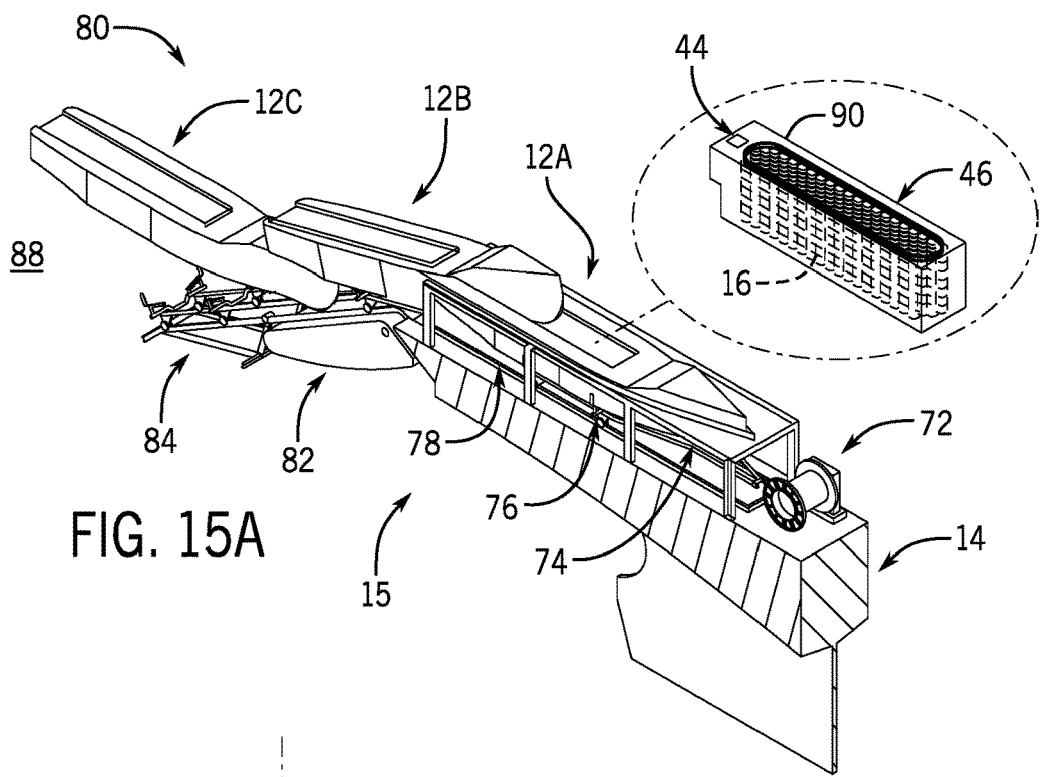
FIG. 15A
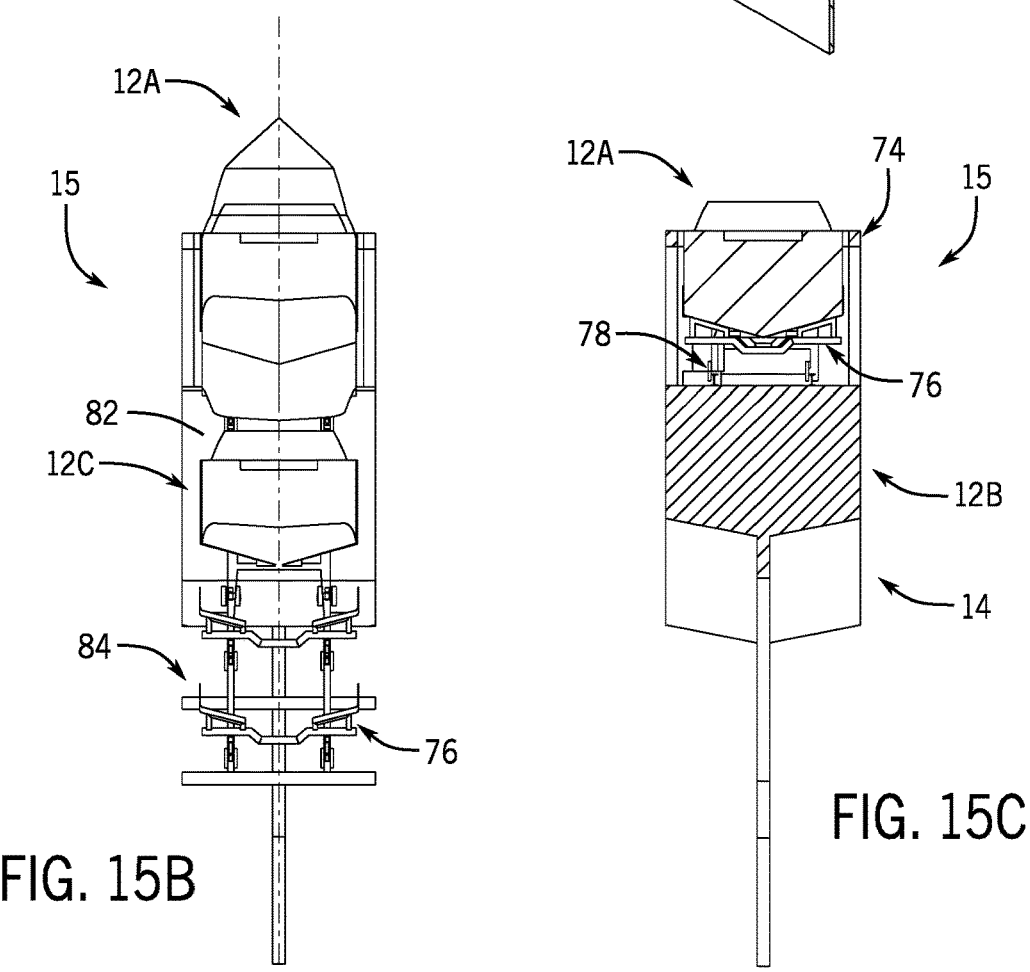
FIG. 15B
FIG. 15C

UNMANNED MARINE VESSEL FOR NODE DEPLOYMENT AND RETRIEVAL

CROSS-REFERENCE TO RELATED APPLICATIONS

This application is a continuation of U.S. patent application Ser. No. 15/410,038, filed Jan. 19, 2017, issued Jun. 26, 2018 as U.S. Pat. No. 10,005,523, entitled UNMANNED MARINE VESSEL FOR NODE DEPLOYMENT AND RETRIEVAL, which claims priority to U.S. Provisional Patent Application No. 62/280,659, filed Jan. 19, 2016, entitled UNMANNED MARINE VESSEL FOR NODE DEPLOYMENT AND RETRIEVAL, each of which is incorporated by reference herein, in the entirety and for all purposes. This application is related to U.S. Provisional Application No. 62/319,598, filed Apr. 7, 2016, entitled UNMANNED MARINE VESSEL FOR SEISMIC SOURCES, which is incorporated by reference herein, in the entirety and for all purposes.

BACKGROUND

This disclosure relates to seismic surveys and marine-based seismic array deployment. More generally, the disclosure relates to deployment and retrieval technologies for marine-based seismic receiver and node systems, including, but not limited to, towed seismic arrays, autonomous ocean-bottom nodes (OBNs), ocean-bottom cable (OBCs), and other towed array and ocean-bottom seismic (OBS) applications.

Traditional marine-based seismic surveys typically utilize a number streamer cables towed behind a seismic survey vessel. Alternatively, a combination of towed streamers and ocean-bottom node system can be used, e.g., using technologies described in one or more of Gagliardi et al., U.S. Pat. No. 8,593,905, entitled MARINE SEISMIC SURVEYING IN ICY OR OBSTRUCTED WATERS, issued Nov. 26, 2013; Lambert et al., U.S. Pat. No. 8,730,766, entitled SEISMIC SYSTEM WITH GHOST AND MOTION REJECTION, issued May 20, 2014; Rigsby et al., U.S. Pat. No. 9,121,969, entitled POWER SAVINGS MODE FOR OCEAN BOTTOM SEISMIC DATA ACQUISITION SYSTEMS, issued Sep. 1, 2015; Roberts et al., U.S. Pat. No. 9,354,343, entitled DECLINATION COMPENSATION FOR SEISMIC SURVEY, issued May 31, 2016; and Gagliardi, et al., U.S. Pat. No. 9,535,182, entitled MARINE SEISMIC SURVEYING WITH TOWED COMPONENTS BELOW WATER SURFACE, issued Jan. 3, 2017; each of which is incorporated by reference herein, in the entirety and for all purposes.

Survey-based seismic exploration is performed by controlled emission of seismic energy using one or more seismic sources (e.g., dynamite, air guns, vibrators, etc.), and monitoring the Earth's response with seismic receiver and node systems configured to detect the reflected seismic waves, in order to create an image of the subsurface. In a typical marine seismic survey, air guns are commonly used to generate seismic energy in the form of acoustic waves, which propagate down through the water column and can penetrate the ocean floor to be reflected from subsurface structures in the survey area. The reflected energy travels back up to the seismic streamers, nodes, or other receivers, where it can be detected by hydrophones, geophones and similar seismic sensors. Scientists and engineers can then perform seismic surveys based on the acquired sensor data, utilizing seismic inversion and other wave exploration techniques to identify and map oil and gas reservoirs, salt and rock formations, and other subsurface structures of interest.

Conventional marine seismic surveys are conducted by towing the seismic sources behind a seismic vessel, along with an array of seismic streamers or other receivers. Receivers can also be deployed along ocean bottom cables disposed on the seabed, or in the form of autonomous nodes deployed at a selected depth and orientation within the water column. The nodes can include a number of different pressure and particle motion sensors located in proximity to one another, for example using a hydrophone system to record scalar pressure measurements of the seismic wavefield, and a geophone array that records three-dimensional vector velocity measurements of the corresponding particle motion. Geophysical data pertaining to the wavefield can be acquired by using the sensors to observe the reflected seismic signals generated by the sources, and the signals can processed to form images representing the subsurface composition and structure of the Earth near the survey location. Deploying and retrieving the seismic receivers and nodes is a complex and logistically challenging task, limiting the number of conventional seismic array configurations that can be used in a given survey area. These challenges tend to increase as larger numbers of increasingly complex node and receiver systems are employed. As a result, there is a need for more flexible and advanced deployment and retrieval technologies, particularly in the area of marine-based seismic receiver and node deployment, and which are not subject to the same limitations of the prior art.

SUMMARY

An unmanned or autonomous marine vessel can be configured to deploy seismic receivers or nodes. For example, the receivers can be deployed on a towed streamer cable or in the form of seismic nodes distributed along a towed rope, ocean bottom cable, or as system of autonomous nodes. Suitable receiver and node systems can be deployed at any depth and orientation in the water column, depending on seismic survey geography.

The unmanned or autonomous seismic vessels can be configured for both deployment and retrieval or recovery of the receivers and nodes, and to provide power, retrieve data and perform other maintenance and service tasks during seismic data acquisition. Systems and methods for operating a system of one or more unmanned or autonomous seismic vessels are also encompassed, as adapted to deploy, service and recover seismic receivers and nodes suitable for use in marine-based seismic survey applications.

An unmanned seismic vessel embodiment is disclosed, having a hull system configured to provide buoyancy, a storage apparatus configured for storing one or more seismic nodes, and a deployment system configured for deploying the seismic nodes to the water column. Each seismic node can have at least one seismic sensor configured to acquire seismic data, where the data are responsive to a seismic wavefield propagating through the water column. A controller can be configured to operate the deployment system, so that the seismic nodes are automatically deployed in a seismic array with the desired spacing, depth, and other geometrical parameters.

Methods of operating such a seismic array can include determining positional information for an unmanned seismic vessel, navigating the unmanned seismic vessel with respect to a water column, based on the positional information, and deploying one or more seismic receivers to the water column. The unmanned seismic vessel can include a hull system configured to provide buoyancy, and each of the seismic receivers can comprise at least one seismic sensor configured to acquire seismic data responsive to a seismic wavefield.

Seismic survey embodiments can include a plurality of unmanned seismic vessels deployed in a water column, with each unmanned seismic vessel comprising a hull system configured to provide buoyancy and a deployment system configured to deploy a plurality of seismic nodes from each unmanned seismic vessel. Each of the seismic nodes can comprise at least one seismic sensor configured to acquire seismic data, and a seismic source can be configured to generate a seismic wavefield propagating through the water column, where the seismic data are responsive to reflections of the seismic wavefield from subsurface structures.

BRIEF DESCRIPTION OF THE DRAWINGS

FIG. 5A is a side section view of an unmanned or autonomous seismic vessel, showing the centerline profile.

FIG. 5B is a side elevation view of the unmanned vessel, showing the outboard profile.

FIG. 14A is a plan view of the ramp and slipway system, in the raised or stowed position.

FIG. 14B is an aft view of the stowed ramp and slipway system, showing a representative gantry crane arrangement.

FIG. 14C is a detail view of the gantry crane.

FIG. 15A is an isometric view illustrating unmanned or autonomous seismic vessel deployment on a ramp and slipway system.

FIG. 15B is an aft view illustrating the seismic vessel deployment procedure.

FIG. 15C is a section view illustrating the seismic vessel during deployment.

DETAILED DESCRIPTION

Figure 1:
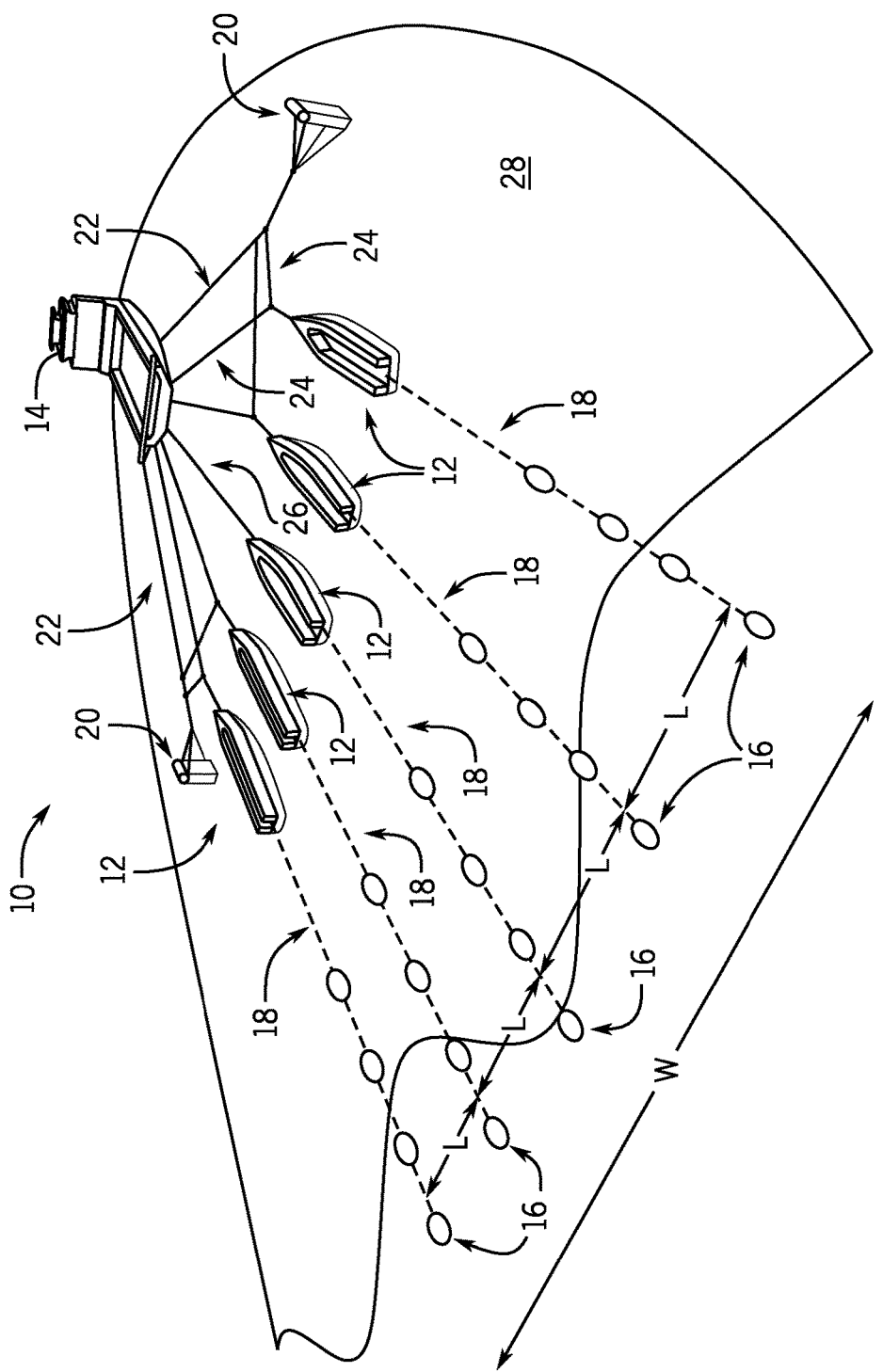
FIG. 1 is a schematic diagram of an exemplary towed seismic array utilizing one or more unmanned or autonomous marine vessels for node handling and deployment.

FIG. 1 is a schematic diagram of an exemplary seismic array or seismic survey system 10, utilizing one or more unmanned or autonomous marine vessels (UMVs) 12. In some embodiments, the unmanned seismic vessels 12 can be towed by a larger tender or "mother" ship 14, with one or more sets of seismic receivers or nodes 16 deployed behind each vessel 12 along a streamer cable, rope or node line 18. Alternatively, one or more such unmanned vessels 12 can be towed by an individual chase vessel or other tow ship 14, or configured in a self-propelled and autonomously navigated embodiment.

In the particular example of FIG. 1, paravanes or deflectors 20 can be deployed to control the spread of the unmanned seismic vessels 12 behind the seismic ship or tow vessel 14, and to maintain a desired overall width W for the seismic array 10. Alternatively, a barovane, diverter or door system 20 may be utilized, with a suitable combination of wide deflector ropes 22, trolley ropes 24, and individual tow ropes or lines 26 configured to maintain the desired spacing L between the individual vessels 12, and the receivers or nodes 16 deployed behind each vessel 12, along the corresponding streamer cables or node lines 18.

Individual unmanned seismic vessels 12 can be configured for independent deployment and retrieval of the receivers or nodes 16 along each streamer cable or node line 18. Other configurations are also encompassed, for example with vessels 12 deployed in sets of two, three or more, each deploying a corresponding set of receivers or nodes 16 along the streamer cable or node line 18. Alternatively, the receivers or nodes 16 can be deployed along one or more ocean bottom cables, ropes or wires 18, or as a set of autonomous ocean bottom nodes 16. In additional embodiments, the unmanned seismic vessels 12 can be configured to deploy a combination of towed receivers and autonomous nodes 16, each individually disposed at any suitable depth and orientation within the surrounding water column or other seismic medium 28.

The techniques described here can thus be adapted to merge streamer and ocean-bottom seismic (OBS) and/or towing (wide tow) applications, based on the desired geometry for any given seismic array or seismic survey system 10. Individual unmanned seismic vessels 12 can also be also be adapted to deploy or retrieve multiple receivers or nodes 16 in a single pass, or both, using additional node handling equipment for automated deployment, storage, winching and recovery. Various pressure transducers and optical or other sensors can also be configured for vessels 12 to perform specialized tasks such as a depth control, node or receiver selection, attachment and detachment, etc. Advanced, non-traditional node designs and rope attachment devices are also encompassed, in combination with other deployment techniques adapted to the requirements of each particular seismic survey system 10, as described herein.

Figure 2:
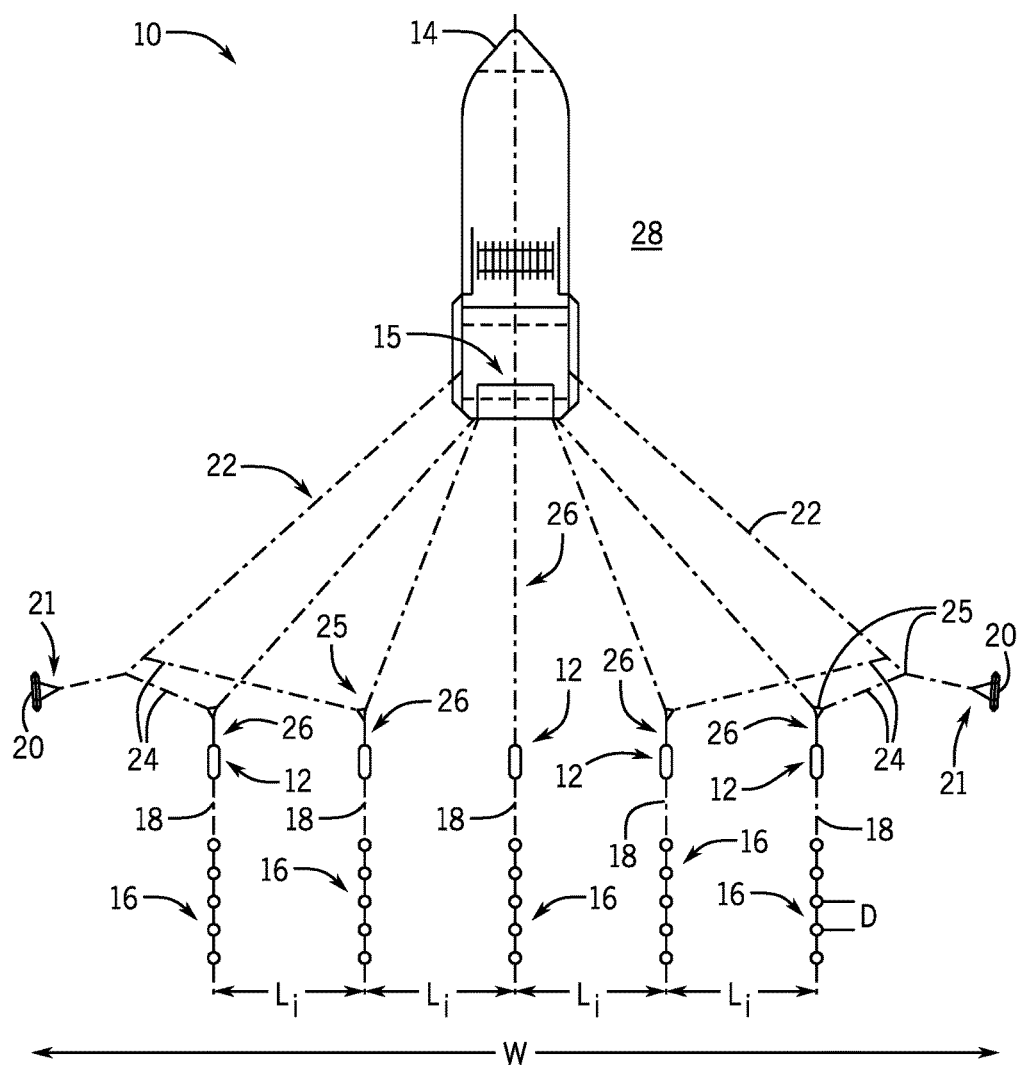
FIG. 2 is a tow diagram for a representative marine seismic array.

FIG. 2 is a tow diagram for a seismic array 10, illustrating the towing configuration and array spacing. As shown in FIG. 2, a number of seismic receivers or nodes 16 are disposed along individual ropes or cables 18, each deployed an unmanned or autonomous marine seismic vessel 12. Tow vessel 14 may also include a gantry system or similar docking apparatus 15 for deploying and recovering the unmanned seismic vessels 12, along with a sheave system and other cable handling components for deploying the paravane or deflector systems 20, e.g., with various deflector straps 21, wide tow ropes (or deflector ropes) 22 and trolley ropes 24, as shown in FIG. 2, and selected trolley blocks, pulling grips, and cable sock couplings 25 to the individual tow lines 26 for each unmanned vessel 12.

In towed configurations, the overall width W of seismic array 10 can be determined by the positioning of the outermost lines 18 of receivers or nodes 16, which is maintained by coupling a paravane or deflector system 20 to each of the outside unmanned seismic vessels 12. For example, deflectors 20 be coupled to wide (deflector) tow ropes 22 via a set of deflector straps or using a similar coupling arrangement 21, with trolley ropes 24 and cross-cabling members running between wide tow ropes 22 (e.g., at the coupling to deflector straps 21) through the couplings 25 at the front end of each of the tow ropes or lines 26, which are attached to the individual unmanned vessels 12. In one particular example deflectors 20 maintain the lateral position of each vessel 12 via trolley ropes 24 and tow lines 26 as shown, but any suitable barovane, paravane, deflector, diverter or door system 20 can be used.

In one particular embodiment, five unmanned seismic vessels 12 can be deployed behind the tow vessel 14, with substantially uniform spacing ($L_i$) between the individual cables or node lines 18, and substantially uniform distance (D) between the individual receivers or nodes 16 on each cable or line 18. This example is merely representative, however, and in general the number of vessels 12 varies with the configuration of seismic array 10, along with the number and spacing of individual receivers or nodes 16 on the cables or lines 18. Similarly, the line spacing ($L_i$) and node distance (D) can be substantially uniform as shown, but in other embodiments these parameters vary, both as to the individual receivers or nodes 16, and with respect to the corresponding cables or lines 18 deployed by each unmanned seismic vessel 12.

The towing configuration can also vary depending on the desired configuration of seismic array 10, and different tow rope and cross-cabling arrangement can be used. For example, a trolley block, pulling grip, or cable sock coupling 25 can be used for coupling trolley ropes 24 to the corresponding tow lines 26, or a single tow line or independent bridle arrangement can be used for one or more of the vessels 12. One or more vessels 12 can also be or towed by an independent chase ship or other vessel, or the vessels 12 can be autonomously navigated.

In contrast to conventional techniques, the receivers or nodes 16 in seismic array 10 are deployed from one or more unmanned seismic vessels 12, with the corresponding cables or node lines 18 oriented generally parallel to the tow direction or (or independent velocity) through the water column 28. The use of unmanned seismic vessels 12 for deployment of the receivers or nodes 16 can thus substantially reduce drag and associated tow stresses, as compared to traditional towing configurations that require extended streamer connections to the tow vessel 14, some of which may run at oblique angles through the water column 28 and can substantially increase both towing drag and tow stresses.

As a result of the improved design of FIGS. 1 and 2, both the width W and overall length of seismic array 10 can also be increased, while reducing drag and providing for more efficient operation of the tow vessel 14. At the same time overall survey time requirements can be substantially reduced, e.g., by coordinating deployment and recovery of the individual cables or node lines 18 independently on each unmanned seismic vessel 12, as compared to conventional techniques where all the streamer cables are deployed directly from a single seismic boat or other tow vessel 14. Conventional techniques for receiver and node deployment on rope and wire systems (and ocean bottom cables) also typically deploy a single line at a time. By facilitating deployment and retrieval of multiple lines substantially simultaneously, or during overlapping deployment windows, the examples and embodiments disclosed here can greatly improve survey efficiency, and significantly reduce associated operational costs.

Unmanned and Autonomous Seismic Vessel Configurations

Figure 3:
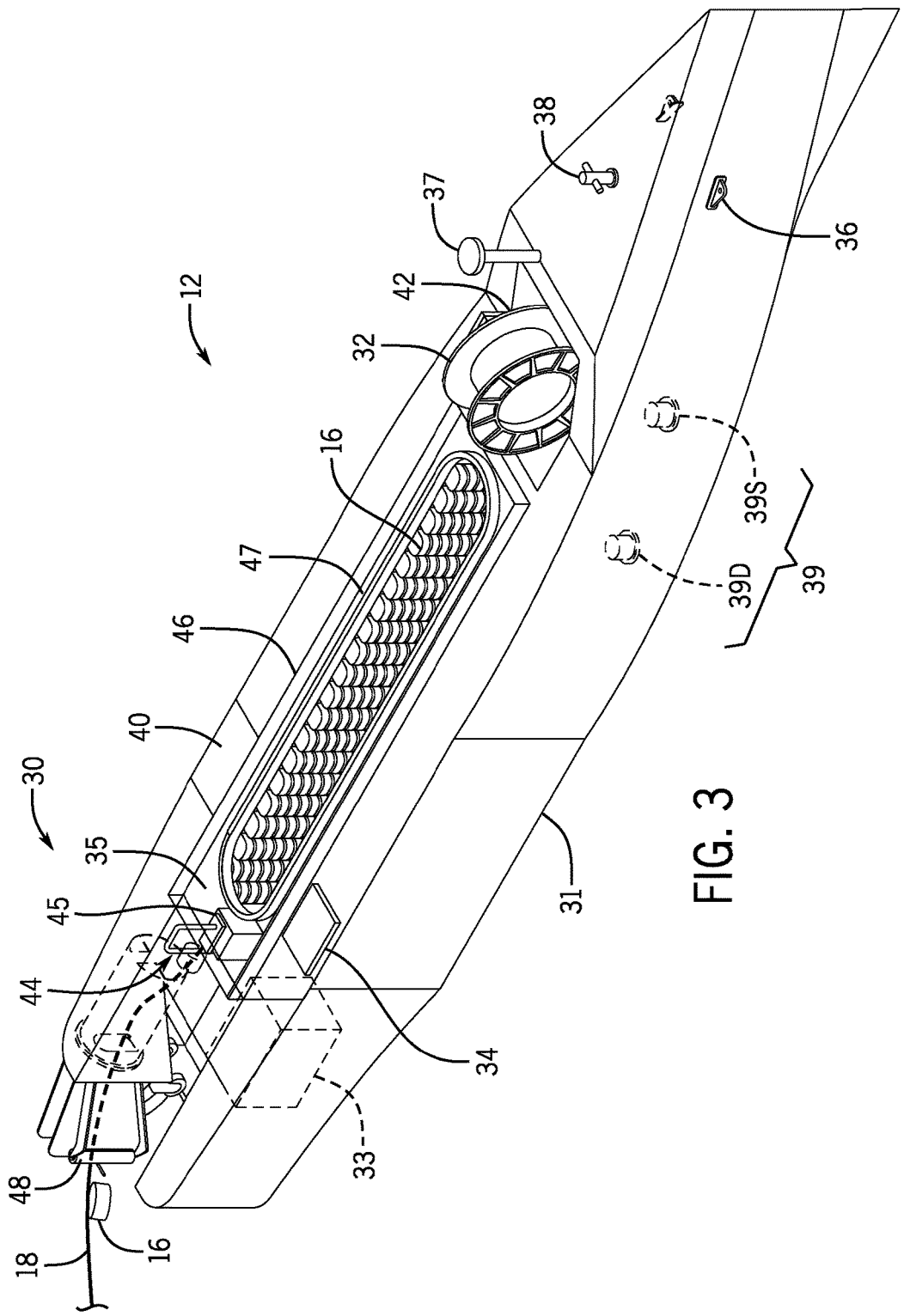
FIG. 3 is an isometric view of an unmanned or autonomous marine vessel configured for seismic node deployment and retrieval.

FIG. 3 is an isometric view of an exemplary unmanned or autonomous marine vessel (UMV) 12, which is provided with a node handling and deployment system 30 for seismic receivers or nodes 16. In this particular configuration, the unmanned or autonomous vessel 12 includes a hull structure or hull system 31 with winch 32, generator 33, fuel tank 34, and a rechargeable battery package or battery system 35.

The hull structure 31 can also accommodate one or more tow lugs 36 and a location system 37, e.g., with a global positioning system (GPS) antenna or similar wireless data interface. A bitt fitting or similar mooring fixture 38 can also be provided, along with various depth and speed transducers 39D and 39S (collectively, on-board sensors 39) for an instrument package and vessel control system 40. In some embodiments, the generator system 33 can also include additional accessories to provide mechanical, electrical, hydraulic and pneumatic power to other systems on board the unmanned vessel 12, for example using a diesel generator system 33 with one or more of a compressor, power take off (PTO) unit, auxiliary power unit (APU) or hybrid power unit (HPU).

The configuration of the node deployment system 30 also varies from embodiment to embodiment. For example, suitable deployment systems 30 may incorporate a winch mechanism 32 with associated rope or cable supply 42, and a stacker/destacker or loading mechanism 44 configured for loading and unloading the seismic receivers or nodes 16 from a rack-based magazine or similar storage apparatus 46. A deployment unit 48 can be disposed at the stern of vessel 12, and configured to deploy the nodes into the water column along a cable or line.

The instrument and control package 40 can include components for both navigation of the vessel 12, and for operation of the deployment system 30. For example, an automated architecture can be used which is responsive to external control signals, and which can operate in an autonomous or automatic mode based on navigational data and other information provided by the positioning system 37. Additional GPS and Inertial Navigation Sensor (INS) components can also be mounted inside the vessel hull (e.g., near the vessel's center of gravity), and configured to monitor the vessel's roll, pitch, yaw, position, velocity, acceleration and deceleration.

In the embodiment of FIG. 3, the unmanned seismic vessel 12 is provided with a node stacker/destacker 44 for storage of seismic receivers in the form of seismic nodes 16, using a track and rack assembly or magazine storage system 46 mounted to the hull structure (or platform) 31 of vessel 12. In these embodiments, the individual nodes 16 can be loaded into columns or magazines which circulate on a carousel 47 operably coupled to the magazine or rack system 46, e.g., utilizing RFID (radio frequency identification) or other automatic systems for individual node identification and selection.

The node stacker/destacker (or loader) 44 may also include an attachment mechanism 45 for coupling the nodes 16 to the cable or rope 18, for example using a clamping member or tether adapted for use with a sheave system or similar deployment unit 48. The deployment unit 48 can thus be adapted for deploying the nodes 16 into the water column along a suitable cable 18. Alternatively, the deployment unit 48 can be adapted for deploying and retrieving individual autonomous nodes 16 to and from the seabed without a cable attachment, for example using a pusher or articulated arm as described below.

The hull system 31 is configured to provide buoyancy to the unmanned seismic vessel 12 when being towed or otherwise deployed into the surrounding body of water. Typically the hull system 31 provides one or more hull components with positive buoyancy, but the hull components can also provide neutral or negative buoyancy if submerged or partially submerged operations are desired. A ballast management system can also be configured to maintain vessel stability in response to changes in weight and mass distribution when nodes 16 are deployed and retrieved, as described below.

The size and configuration of each unmanned seismic vessel 12 varies depending upon navigational considerations and the number and type of receivers or nodes 16 to be deployed. In seismic node-based applications, for example, each unmanned seismic vessel 12 can be outfitted with up to 528 nodes 16, deployable along up to 12.5 km or more of rope or cable 18. In other embodiments, up to 2500 or more seismic nodes 16 can be stored on each vessel 12, and deployed along up to 60 km or more of rope or cable 18.

In some of these embodiments, the node (or receiver) spacing distance may be about D≈20 m to about D≈25 m. Alternatively the spacing varies, for example from about D≈10 m to about D≈20 m or less, or with D≈25 m to D≈50 m or more. The individual nodes 16 can also be deployed along ropes, wires or ocean bottom cables 18, as described herein, or deployed as an array of autonomous nodes, in order to provide the desired configuration for each particular seismic array or survey system 10.

Figure 4:
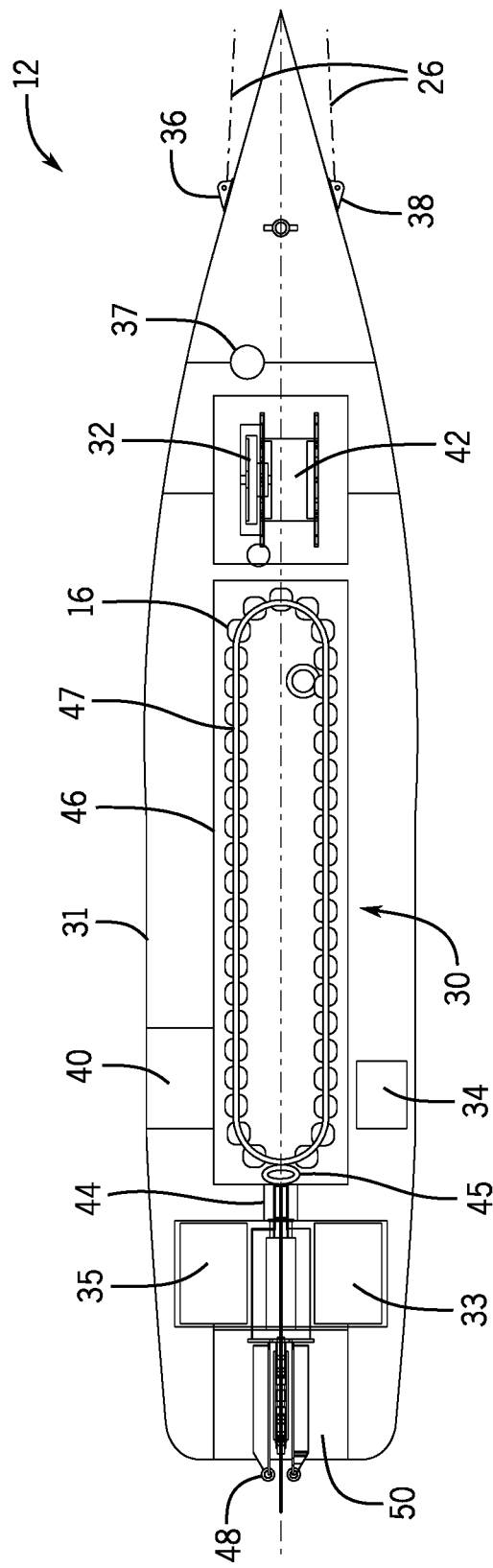
FIG. 4 is a top plan view of the unmanned seismic vessel, showing the main deck configuration.

FIG. 4 is a plan view showing a representative main deck configuration for an unmanned or autonomous marine vessel 12, e.g., with a seismic node storage, handling and deployment system 30 mounted to the hull structure 31, as described herein. As shown in FIG. 4, the storage apparatus or magazine 46 is mounted generally along the centerline of the unmanned seismic vessel 12, and provided in a rack or magazine format operated with a carousel apparatus 47. Winch mechanism 32 and loader 44 are located forward and aft of storage apparatus 46, respectively, and deployment unit 48 is located aft of loader 44, on the stern end of hull structure 31.

In towed embodiments, one or more towing lugs 36 can be used to tow unmanned seismic vessel 12, for example using a two-point towing bridle or similar arrangement for tow line 26. Both shallow and deep water operations are encompassed, e.g., with the tow lines 26 coupled to a chase vessel, or deployed between a pair of paravane or diverter systems using a combination of trolley lines, spacers or other cross-cabling, as described above.

The tow line or lines 26 can include connections for electrical power and data communication with control package 40 on board unmanned seismic vessel 12. Alternatively, a wireless communication system can be used for data exchange and external control signals, e.g., via a radio interface such as the antenna provided for positioning system 37, without direct cabling connections to the tow vessel. In autonomous embodiments, the hull structure 31 can be provided with an engine or propulsion system 50 utilizing a rudder or similar steering mechanism, and configured for automatic navigation by the control package 40 in communication with the positioning system 37 and additional GPS or Inertial Navigation Sensor (INS) components, as described above.

Deployment system 30 includes winch 32, loader 44 with node attachment mechanism 45, storage apparatus 46, and deployment unit 48. The components can be powered by the generator system 33, for example using a combination of power take-off and hybrid or auxiliary power units in combination with a rechargeable battery system 35. Generator 33 and battery system 35 can also provide power to the positioning system 37, sensors 39, control package 40 and other onboard components of the unmanned seismic vessel 12, without the need for external power connections to the tow vessel.

Operation of deployment system 30 for automatic deployment and retrieval of seismic receivers or nodes 16 can be performed in response to commands from the on-board vessel control package 40, or based on information from positioning system 37 and other depth, speed and other navigational data from on-board sensors 39 (e.g., including depth and speed transducers 39A and 39D). Automatic node deployment, retrieval and other operational commands can thus be generated independently by the control package 40 operating autonomously on board the unmanned seismic vessel 12, e.g., in response to entering or leaving a designated survey area, or based on an obstruction or other navigational hazard, without the need for contemporaneous external command input.

Alternatively, control package 40 can generate the operational commands for deployment system 30 based at least in part on external control signals, e.g., using a wireless data interface in the location or positioning system 37 to communicate with a navigational control system on board the tow vessel, or in communication with a seismic source boat or chase vessel. One or more remote computing systems can also be employed as part of a remote network or cloud-based control system, as described below, without necessarily requiring a nearby surface vessel, communications buoy, relay station, or other local control/communications equipment within any particular range of the unmanned vessel 12.

FIG. 5A is an elevation view showing a centerline profile of a representative unmanned or autonomous marine seismic vessel 12, as described herein. FIG. 5B is an elevation view showing an outboard profile of the unmanned vessel 12.

As shown in FIGS. 5A and 5B, a weather-tight cowling or coaming and cover system 52 can be provided for unmanned seismic vessel 12, e.g., for operation in rough seas or under partially submerged conditions. In this particular example, cowling 52 can be provided to cover one or more of the winch 32 and cable store space, loader 44 and node attachment mechanism 45, and node storage apparatus 46. Cowling 52 can also be provided for the generator, battery system, control package, and other on-board components of the unmanned vessel 12.

The hull system 31 can be provided with a rudder mechanism 54 for steering. Additional bow or stern planes 56, ballast tanks 58, fins and other control components can be configured to maintain a desired course and depth as a function of the corresponding measured depth and velocity determined by transducers 39D and 39S, and other location information provided by the on-board positioning system 37 and navigational/control package 40.

The hull system 31 is configured to maintain stability seaworthiness under a wide range of weather conditions, and to satisfy other appropriate regulatory and design requirements. Suitable hull systems 31 can also be designed to move efficiently through the water at both high and low speeds, and under a variety of different towing loads. A ballast management program can be provided as part of the navigational system in the control package 40, and configured to operate the planes or fins 56 and ballast tanks 58 to control the weight and mass distribution of vessel 12, and to maintain stability in response to changes in the towing load and mass redistributions that occur when the nodes 16 are deployed and retrieved.

Figure 6A:
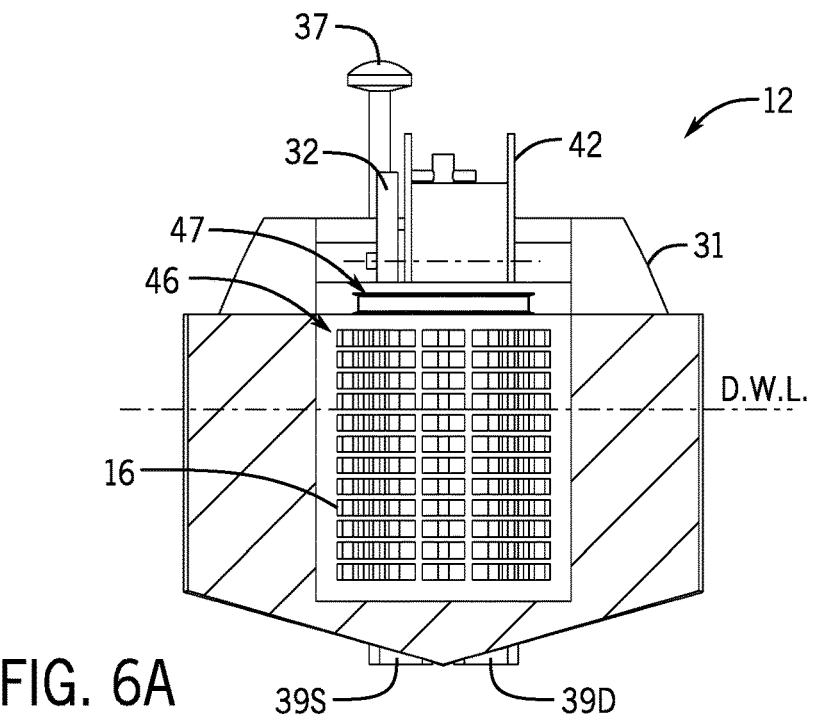
FIG. 6A is a midship section view of an unmanned or autonomous seismic vessel, showing a representative winch and node handling configuration.
Figure 6B:
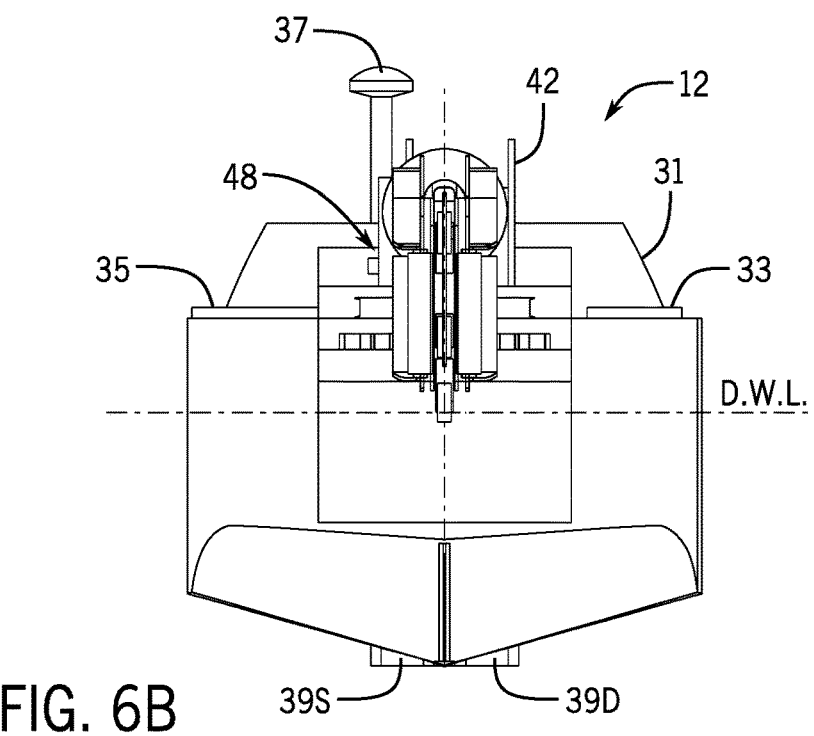
FIG. 6B is an aft section view of the unmanned vessel, showing the deployment configuration.

FIG. 6A is a midship section view of a representative unmanned or autonomous marine seismic vessel 12, showing the winch 32 and cable supply or cable store 42 extending above the storage apparatus 46 for seismic receivers or nodes 16. FIG. 6B is an aft section view of the unmanned vessel 12, showing the deployment unit 48.

As shown in FIGS. 6A and 6B, winch apparatus 32, cable store 42 and deployment unit 48 are positioned generally along the centerline ($C_L$) of the unmanned seismic vessel 12. The node storage apparatus 46 is provided in a rack-type or magazine format, with nodes 16 stacked in columns extending above and below the designated waterline (DWL). In some embodiments, a carousel apparatus 47 can be operably coupled to the storage apparatus 46 and used to position selected nodes 16 with respect to the stacker/destacker, and to place the nodes adjacent the rope or cable for attachment and detachment during deployment and recovery.

Deployment unit 48 can be provided in the form of a sheave apparatus, and configured to guide the cable and attached nodes off the aft end of unmanned seismic vessel 12 for deployment into the water column. In operation, the cable is payed out from the cable store 42 by the winch 32. Selected nodes 16 are positioned with respect to the loader by carousel 47, and attached to the cable via a clamping mechanism or tether member. Deployment unit 48 guides the cable and attached nodes 16 off the aft end of vessel 12, and into the water column.

For retrieval, winch system 32 operates to take in the cable and attached nodes via the sheave system or deployment unit 48. The nodes 16 can then be decoupled from the cable, e.g., by detaching the clamping mechanism or tether, and loaded back onto the storage apparatus 46 using the stacker/destacker and carousel 47.

Depending on application, the nodes 16 can be towed behind the unmanned vessel 12 for seismic data acquisition, or deployed on the ocean floor. In autonomous node embodiments, deployment unit 48 can be configured with an articulated arm, pusher, or similar mechanism adapted to deploy and recover the individual nodes 16 directly to the seabed (or other selected location), without a cable connection. In these examples, deployment unit 48 can interface directly with the loader and storage apparatus 46 for deployment and recovery of individual nodes 16, without a separate cable attachment mechanism.

Docking and Deployment Configurations

Figure 7A:
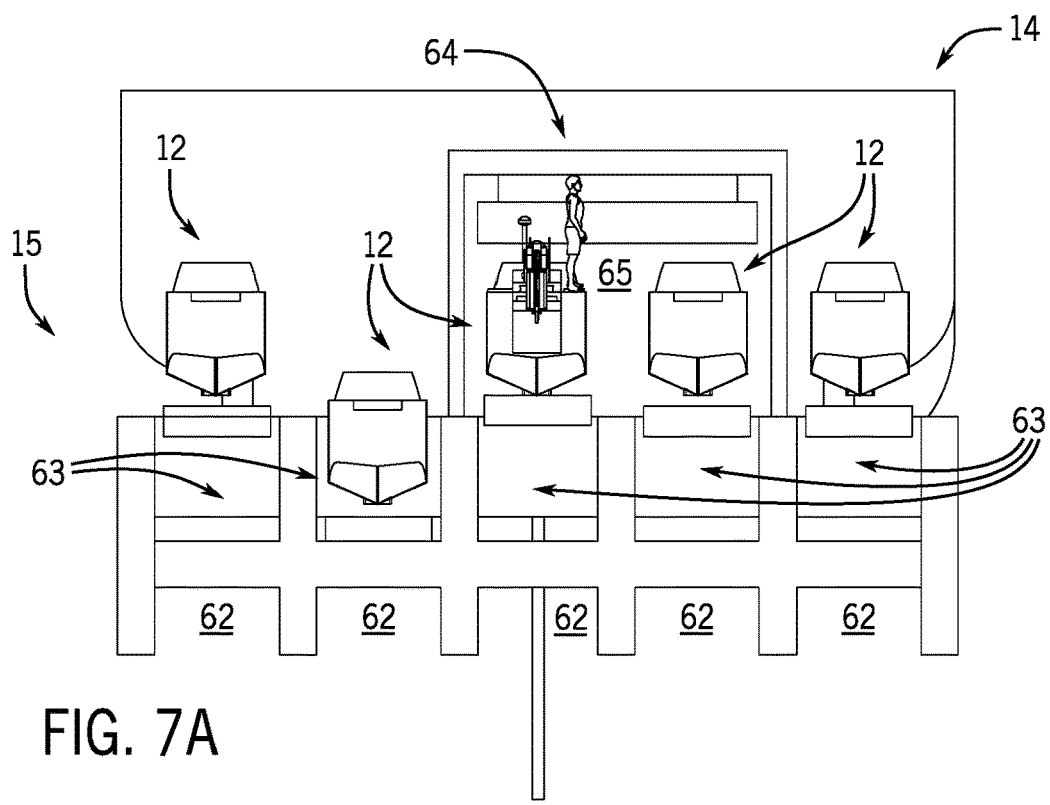
FIG. 7A is an aft end view of a docking apparatus for unmanned or autonomous seismic vessels.

FIG. 7A is an end view of a docking station or apparatus 15 configured for unmanned or autonomous marine seismic vessels 12. As shown in FIG. 7A, docking apparatus 15 is deployed on the aft end or stern of a seismic boat, tow vessel or tender ship 14. In this embodiment, docking apparatus 15 is configured with a number of individual slipways or docking bays 62, and a davit or gantry crane 64 configured for deployment and retrieval of one or more vessels 12.

Suitable docking stations or docking systems 15 can provide up to five or more individual UMV bays 62, arranged side-by-side along the stern of the tender or "mother" ship 14. More bays (or fewer bays) can also be provided, depending on application, and the location of the docking apparatus 15 can also vary. For example, the docking apparatus 15 can also be mounted along the port or starboard side of a tender ship 14, or disposed in either the bow or stern area.

Each slipway or bay 62 can be adapted to accommodate an unmanned or autonomous seismic vessel 12. Lift mechanisms 63 can be provided in each bay 62, and configured for deploying the vessels 12 by lowering the hull into the water. Similarly, vessels 12 can be retrieved by using lifts 13 to hoist the hulls out of the water, back up into the upper portion of the bay 62.

The davit or gantry crane 64 can be configured to access each of the bays 62, for deployment, recovery and service operations on each unmanned seismic vessel 12. Suitable gantry crane embodiments 64 can also be adapted to transport vessels 12 to and from the back deck area of the tender ship 14 for storage and maintenance, e.g., via an access door or hatchway 65.

Figure 7B:
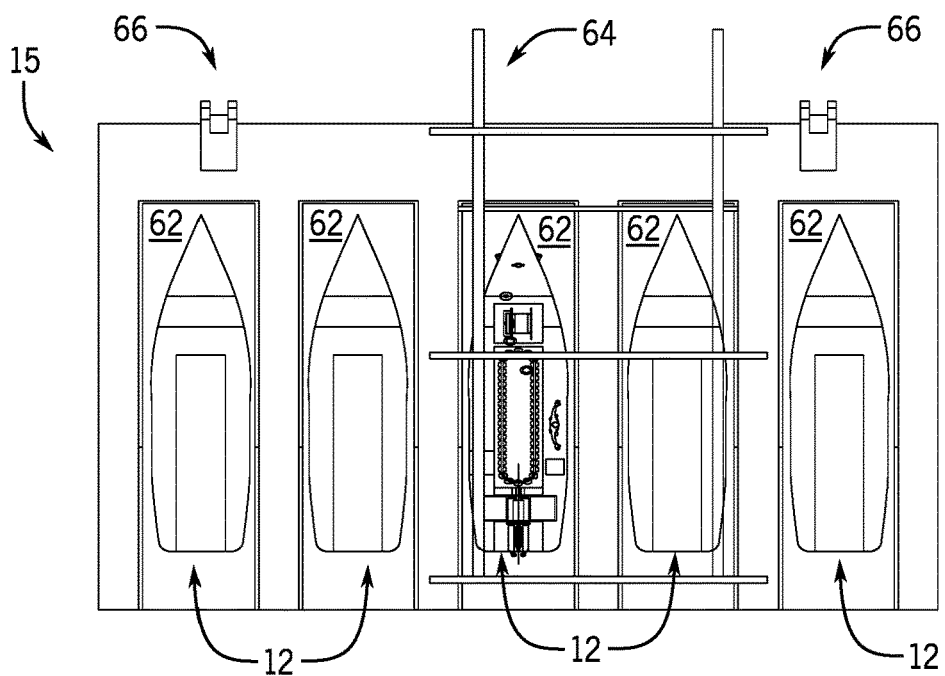
FIG. 7B is a top plan view of the docking apparatus, showing the individual docking bays.

FIG. 7B is a top plan view of the docking station or apparatus 15, showing the individual slipways or docking bays 62 for the unmanned or autonomous seismic vessels 12. Docking apparatus 15 can be coupled to the tow ship or tender using one or more articulated coupling fixtures 66. Coupling points or fixtures 66 can be configured to articulate with sea action, allowing for relative motion of the docking apparatus 15 with respect to the stern of the tender. Alternatively, the docking apparatus 15 can be more or less permanently attached to the stern of the tender, or the docking components can be mounted directly onto the back deck area.

In some embodiments, for example, one or both of the crane 64 and bays 62 can be mounted directly onto the stern of a seismic vessel, rather than being provided as an independent docking apparatus 15. In additional embodiments, bays 62 may be omitted, with the davit or gantry crane 64 configured to lower the hulls of the unmanned seismic vessels 12 directly onto the surface of the surrounding body of water. For retrieval, the davit or crane 64 raises the hull from the surface, and deposits it onto the back deck area in a designated storage location (or for relocation elsewhere).

The back deck area can also be partially submerged for deployment and retrieval. In these embodiments, the unmanned vessels 12 are deployed directly into the water column from the submerged or flooded portion of the back deck. For retrieval, the unmanned seismic vessels 12 can simply be towed or navigated into desired locations in the submerged region, and stored in place when the back deck area is pumped out.

Figure 8A:
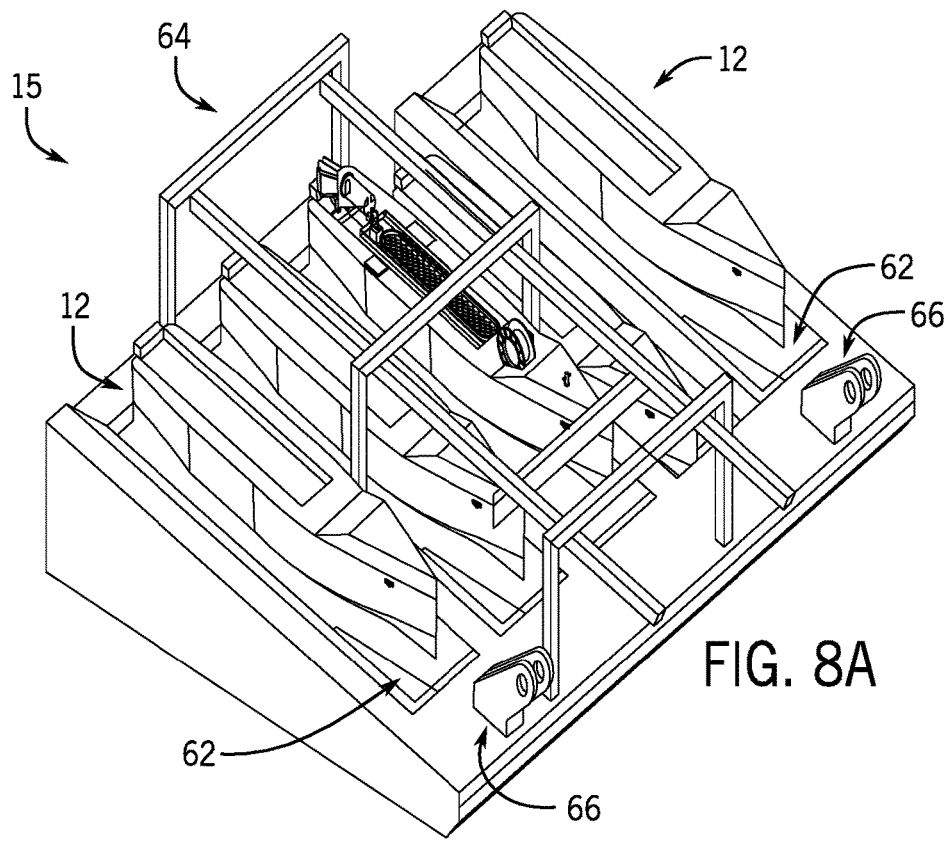
FIG. 8A is an isometric view of a docking apparatus for unmanned or autonomous seismic vessels, showing a representative gantry crane arrangement.
Figure 8B:
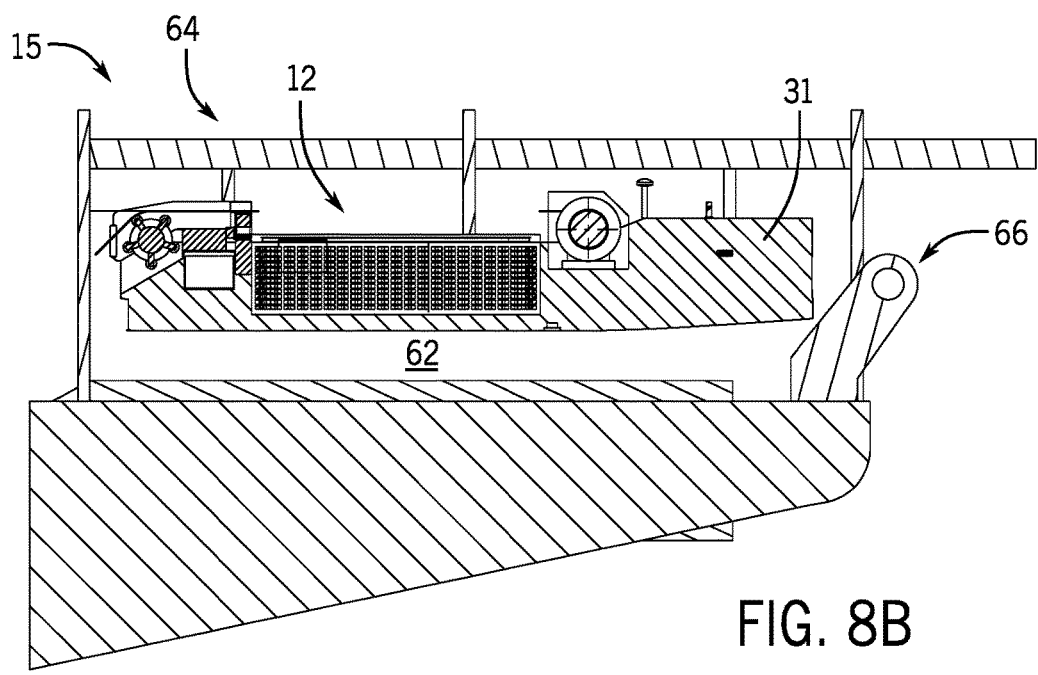
FIG. 8B is a side elevation view of the docking apparatus, illustrating operation of the gantry crane.

FIG. 8A is an isometric view of the docking station or docking apparatus 15. FIG. 8B is a side elevation view of the docking apparatus 15, illustrating operation of the gantry crane 64.

As shown in FIGS. 8A and 8B, a suitable portable vessel docking station or apparatus 15 can be constructed independently of the seismic vessel. The docking apparatus 15 can thus be fabricated in one location, and then assembled and installed or removed at any number of other suitable port facilities. Docking apparatus 15 can also be configured for loading and unloading nodes, rope, cable and other equipment on the unmanned or autonomous seismic vessels 12. These operations can be accomplished with the gantry crane 64, or using a specialized loading system. These additional options also provide for additional flexibility in choice of materials and construction methods, in order to save weight and reduce costs.

Depending upon embodiment, docking apparatus 15 can be provided with specialized articulated coupling fixtures 66 for some operations, and then fixed or pinned into position with additional coupling members when using the gantry crane. This option can reduce relative motion with respect to the seismic ship, when performing deployment, recovery, or service operations on the unmanned vessels 12. The vessel attachment points can be designed to accommodate rigorous regulatory considerations (e.g., class approval), whether or not the platform and docking system is subject to the same requirements.

While the deployment of docking apparatus 15 may impact vessel maneuverability, operations can also be performed at low speeds or under other conditions where the impact can be compensated for and the effects may be reduced or minimized. A seismic ship can also be configured to sail with docking apparatus 15 attached during survey operations and other project work, and with docking apparatus 15 detached and removed for transits.

Instrument Package and Control System Configurations

Figure 9:
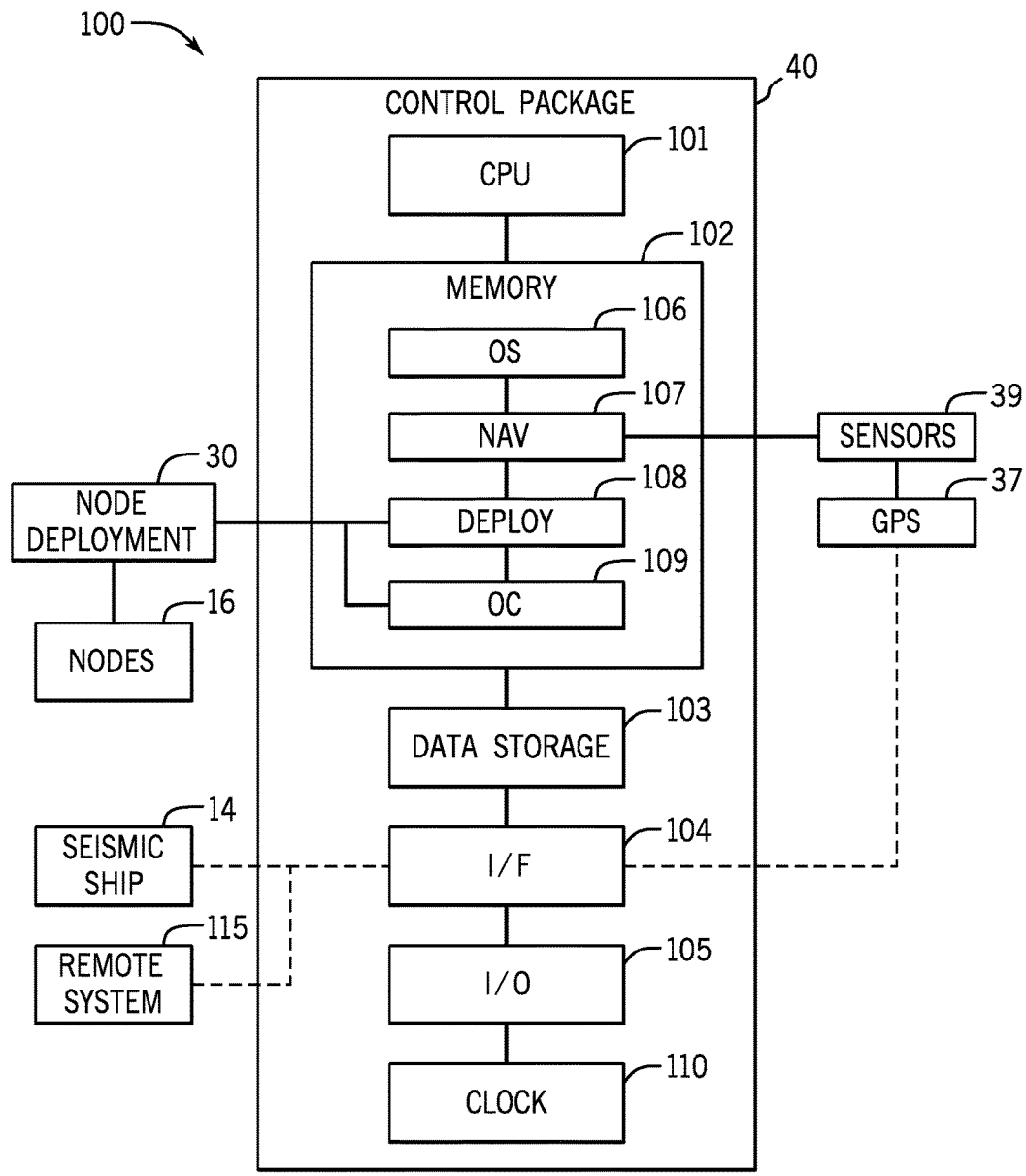
FIG. 9 is a block diagram of a control system configured for operation of an unmanned or autonomous seismic vessel.

FIG. 9 is a block diagram of an exemplary control system 100 for operation of an unmanned or autonomous marine seismic vessel 12, as described herein. As shown in FIG. 9, the control system 100 may include an instrument package 40 with one or more computer processor or central processing units (CPU) 101, memory components 102, data storage media 103, wired or wireless network interface (I/F) devices 104, and input/output (I/O) devices 105.

While a single CPU or processor component 101 is shown, a plurality of processors 101 and related memory, storage, interface and I/O components 102, 103, 104 and 105 can be implemented, and multiple computer systems can be combined into a given vessel control system 40. The control system 40 can also be provided with a master clock 110 configured to provide precision timing information to the deployed nodes, in order to maintain synchronization when seismic data are acquired over a wide-area seismic array.

Suitable network interface (I/F) devices 104 can incorporate a combination of wired and wireless communication hardware, e.g., with a control and navigational system on board the tow vessel or other seismic vessel 14, and/or with a wireless network or cloud-based remote data storage and processing system 115. Suitable input/output (I/O) devices 105 include monitors, touchscreens, keyboards and similar locally accessible user interface components, which can be used during system setup and maintenance but may not be required during unmanned and autonomous operations. Additional I/O devices 105 include data ports, data buses and similar communications hardware that interface with I/F devices 104 to provide a combination of local and remote communications for control system 40.

Suitable on-board memory components 102 and data storage media 103 include, but are not limited to, random access memory, read-only memory, disc drives, portable memory devices, and direct and indirect access storage devices. The memory components 102 and data storage media 103 may also share address space and logical descriptors, spanning multiple physical storage devices and media formats.]

The memory components 102 can be configured to access program code stored on one or more non-transitory storage components of the computer-readable storage media 103, for execution by processor 101 in the form of an operating system (OS) 106. Various control system modules can be provided to operate the unmanned vessel by executing within or in cooperation with the operating system 106, including one or more of a location or navigational program 107, a deployment program 108, and an operational control program 109.

The navigational program (NAV) 107 can be configured to process information from the positioning system 37, along with depth, speed and other information from the on-board sensors 39. Suitable sensor devices 39 include depth and velocity sensors 39D and 39S, optical sensors, and other on-board sensor devices. Additional location and sensor systems such as sonar, radar, LIDAR, and optical or radio-based location systems can also be used to help determine the absolute geographical location and navigational path of the unmanned seismic vessel, as well as the relative position and velocity with respect to the tow ship and other unmanned vessels in the seismic survey area.

Deployment program 108 is configured for operation of the node handling, storage and deployment system 30, in order to deploy and retrieve selected seismic receivers and/or nodes 16. Typically, deployment and retrieval signals are determined in cooperation with the navigational program 107, for example based on entry or departure from a designated seismic survey area. The deployment program 108 can also be configured for deploying the receivers or nodes 16 at desired depths and in selected locations within the survey area, as determined by navigational program 107.

An operational control program (OC) 109 can also be provided for execution during seismic data acquisition. Suitable OC operations include providing power to the deployed receivers or nodes and acquiring data, either in real time during seismic data acquisition, or after recovery. Suitable operational control programs 109 can also provide acquisition commands and precision timing information to the receivers or nodes 16, using the master clock circuit 110.

In additional embodiments, operational control program 109 can be adapted to help position the receivers or nodes during deployment and data acquisition, for example by controlling steering devices disposed along the deployed cable or rope, in order to maintain a desired depth or spacing with respect to other receives and nodes in the array. Alternatively, one or more of these functions can be performed by the navigational program 107 or deployment program 108. More generally, the features of the navigational program 107, deployment program 108, and operational control program 109 can be performed by any number of independent program code blocks or modules, or using an integrated vessel control system 40.

Control system 40 can also be configured to operate in either autonomous or semi-autonomous mode, using interface and I/O hardware 104 and 105 for communication with navigational systems on board a nearby seismic vessel 14, or with a remote or cloud-based navigational system 115. In these examples, the interface components 104 can include a variety of wireless network and long-range radio or satellite relay components.

In autonomous operation, vessel control system 40 is configured to operate navigational program 107 to maintain course, depth and position for the unmanned seismic vessel, and to deploy the receivers or nodes within a desired survey area. Control system 40 can thus be adapted to start and stop data acquisition, change the deployment depth, and retrieve the receivers or nodes in response to navigational hazards and other locational references that may exist. Navigational program 107 can also be adapted for vessel control system 40 to maintain a desired inter-vessel spacing ($L_i$) with respect to other unmanned seismic vessels in the survey area, as well as the overall width (W) or "paintbrush" of the seismic array, as described above.

Operation of deployment system 30 can also be performed based on a combination of external command input and information from the on-board navigational program 107. Typically, the vessel control system 40 will retain at least some level of autonomy, even without contemporaneous external command input, including the ability to make course corrections based on on-board data indicating a navigational hazard, or in order to override external deployment signals and retrieve the seismic receivers or nodes 16 based on speed, position, depth and other navigational information, as described above.

Some embodiments of control system 40 may be implemented as a program product or executable method for use with a computerized system. Suitable programs can define functions of the various embodiments and methods described here, and can be provided via a variety of non-transitory computer-readable media. Illustrative computer-readable media include, but are not limited to: (i) information permanently stored on non-writable storage media (e.g., read-only memory within a computer such as ROM devices or); (ii) alterable information stored on writable storage media (e.g., random access or RAM devices, flash memory and other solid-state devices, and magnetic disks or hard drives); and (iii) information conveyed to a computer by a communications medium, such as through a wireless network, including applications, program code and other information downloaded from the Internet or other network. Non-transitory computer-readable media can be adapted for storing computer-readable instructions that are executable on a computer processor to direct the various functions and method steps described here, and these also represent suitable embodiments for practicing the claims.

Figure 10:
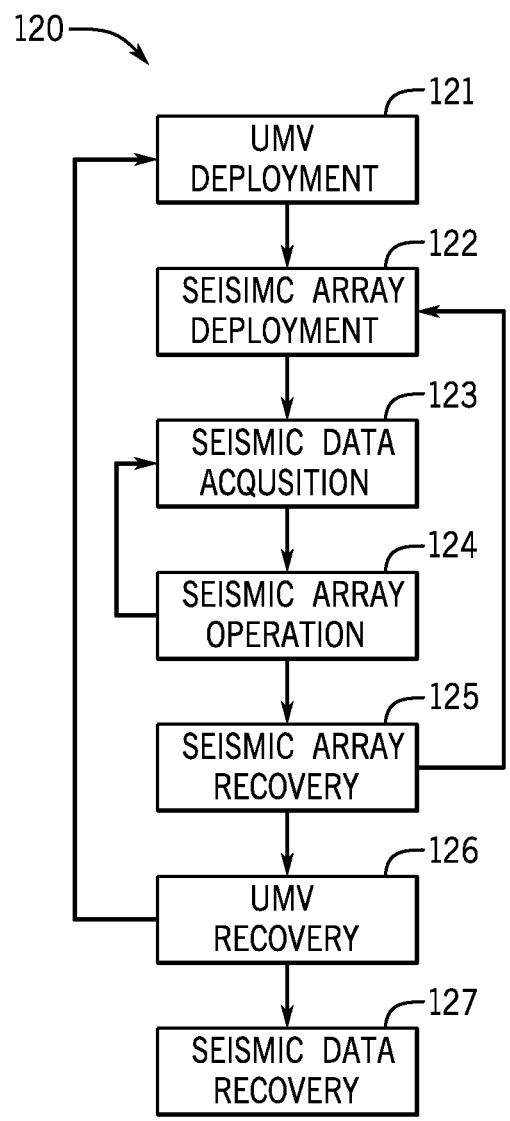
FIG. 10 is a block diagram of a method for operating one or more unmanned or autonomous seismic vessels to perform a marine seismic survey.

FIG. 10 is a block diagram of a method 120 for operating one or more unmanned or autonomous seismic vessels to perform a marine seismic survey, as described herein. As shown in FIG. 10, method 120 may include one or more steps of unmanned or autonomous vessel (UMV) deployment (step 121), seismic array deployment (step 122), seismic data acquisition (step 123), seismic array operation (step 124), seismic array recovery (step 125), and vessel recovery (step 126). The steps can be performed in any order or combination, and iterated as desired in order to provide suitable seismic data for recovery (step 127) and imaging the subsurface structures of interest in a given survey area.

Vessel deployment (step 121) can encompass operating one or more unmanned or autonomous seismic vessels in a desired seismic survey area. Depending upon application, the vessels may be deployed from a tender vessel or mother ship, for example using a gantry crane and slip-based docking apparatus on the back deck, as described herein. Alternatively, the back deck area can be partially submerged or flooded, and the unmanned seismic vessels can be individually positioned in the flooded or submerged area as desired.

In some embodiments, the vessels are towed behind a source boat or seismic vessel, for example using a paravane or diverter system with suitable tow lines, trolley lines and other components in order to maintain a desired spacing. Alternatively, one or more of the vessels can be towed behind a chase vessel or other surface vessel of opportunity, or provided in self-propelled, autonomously navigated form.

Seismic array deployment (step 122) can encompass deploying a set of one or more seismic receivers or nodes from each of the unmanned seismic vessels. For example, the vessels may be configured with a track and rack-based magazine storage apparatus or carousel system, using a stacker/destacker or similar loading mechanism to select individual receivers or nodes for deployment. The nodes can be coupled to a cable or rope via a clamping mechanism or tether member, and deployed into the surrounding water column using a winch mechanism and cable store in combination with a sheave mechanism on the after end of the vessel. Alternatively, the seismic receivers or nodes can be deployed along an ocean bottom cable or rope, or an articulated arm or pusher mechanism can be used to deploy autonomous nodes at any desired depth and orientation, without necessarily requiring a cable connection.

Seismic data acquisition (step 123) can encompass acquiring seismic data with the deployed array, for example using a variety of hydrophones, geophones and other seismic sensors disposed on the receivers and nodes in order to sample a seismic waveform propagating in the surrounding water column. The seismic data can be time stamped using a local clock on the receiver or node, and stored together with the associated timing information. In some embodiments, seismic data acquisition also includes firing the seismic sources to generate seismic energy in the form of acoustic waves, which propagates through the water column to generate the seismic wavefield.

Seismic array operation (step 124) can encompass providing power to the deployed receivers or nodes and acquiring data, either in real time during seismic data acquisition or after retrieval. Suitable operational control commands can also be provided in real time, for example data acquisition begin, stop and pause commands, along with precision timing information for the local clocks on the individual receivers or nodes, in order to maintain synchronization across the seismic array. Seismic array operation can also encompass providing commands to position the receivers or nodes during data acquisition, for example by controlling steering devices disposed along the deployed ropes or cables in order to maintain a desired depth and spacing with respect to other receivers or nodes in the seismic array, or to change the deployment depth in order to change the acquisition geometry or avoid a navigational hazard.

Seismic array recovery (step 125) can encompass recovering the deployed nodes and receivers, for example using a winch and sheave mechanism to retrieve a streamer cable or node line from the water column. In some embodiments, the receivers or nodes can be decoupled from the rope or cable for storage, for example using a rack or magazine-based carousel arrangement. Alternatively, an articulated arm or pusher mechanism can be used to recover autonomous seismic nodes deployed individually onto the ocean bottom, or at any depth and orientation in the water column.

Vessel recovery (step 126) can encompass recovery of the unmanned seismic vessels to a tender ship or other vessel, for example using a docking apparatus or a submergible back deck area as described above. In some embodiments the unmanned vessels are towed for deployment, operation, and recovery, and in other embodiments one or more of the vessels can be self-propelled and configured for automatic or autonomous navigation during deployment and recovery.

Seismic data recovery (step 127) can encompass communication of the acquired seismic data in real time by the unmanned seismic vessels during data acquisition, after recovery of the seismic receivers and nodes onto the individual unmanned vessels, or upon recovery of the unmanned vessels to a source boat, chase vessel, tender, or other surface vessel. The seismic data can be used to generate images of subsurface structures in the survey area, for example using waveform inversion techniques as described above.

Ramp and Slipway Deployment System

Figure 11A:
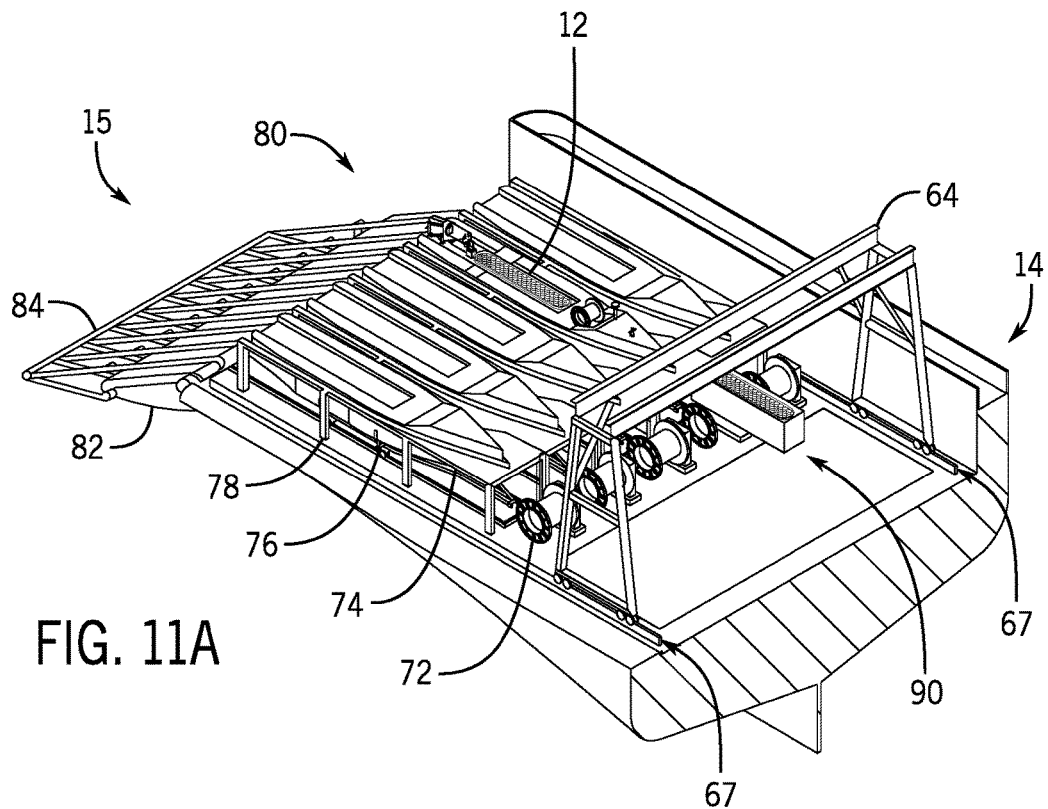
FIG. 11A is an isometric view of a docking apparatus with a hinged ramp and slipway system for unmanned or autonomous seismic vessels.

FIG. 11A is an isometric view of an alternate docking apparatus 15 mounted on the back deck area of a seismic vessel 14, with a hinged ramp and slipway system 80 for autonomous seismic vessels 12. As shown in FIG. 11A, one or more of a tow winch 72, docking station or platform 74 and carriage 76 disposed on tracks or rails 78 can be provided for each seismic vessels 12, and configured for deployment and retrieval operations on the hinged ramp 82 and hinged slipway 84.

The docking apparatus 15 may also include a gantry crane 64, e.g., mounted on tracks or rails 67 for servicing the seismic vessels 12 before, during and after deployment and retrieval operations. In some embodiments, the gantry crane 64 can be configured to load portable node storage and stacker modules or units 90 onto seismic vessels 12. In these embodiments, the receivers or nodes can be preloaded into modules 90 configured for removably mounting to the hull structures of selected seismic vessels 12, for example using a rack-based magazine storage configuration with a stacker/destacker or similar loading mechanism, as described herein.

Figure 11B:
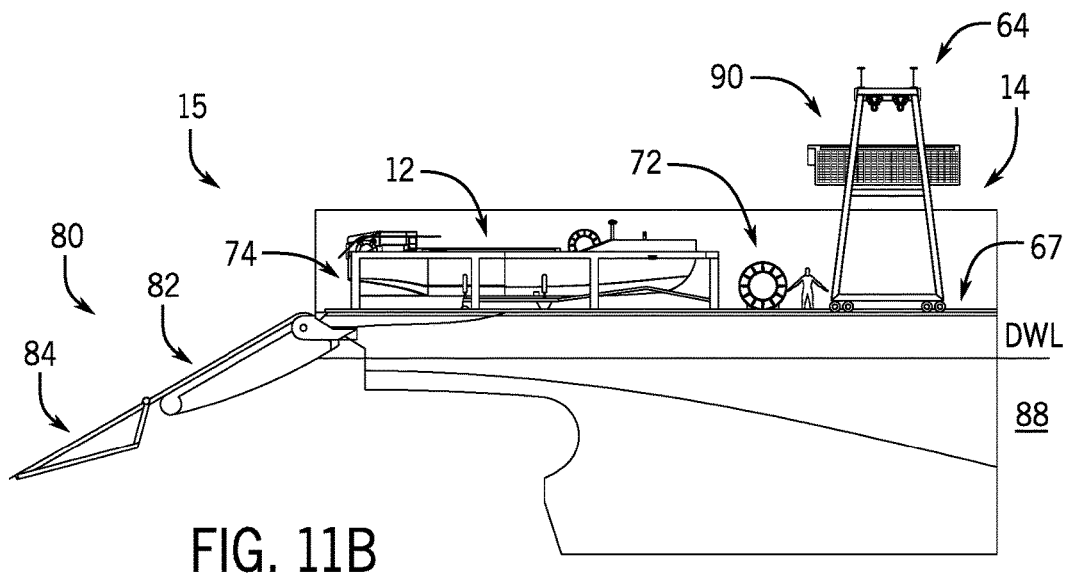
FIG. 11B is a profile view of the ramp and slipway system, in a deployed configuration.

FIG. 11B is a profile view of the ramp and slipway system 80, in a deployed configuration. As shown in FIG. 11B, the hinged ramp(s) 82 and slipway(s) 84 have been deployed off the back deck area of the seismic vessel 14, e.g., with each hinged ramp 82 extending down through the designated water line (DWL) to a slipway 84 configured for deployment and retrieval of seismic vessels 12 in the surrounding body of water (or water column) 88.

Figure 12A:
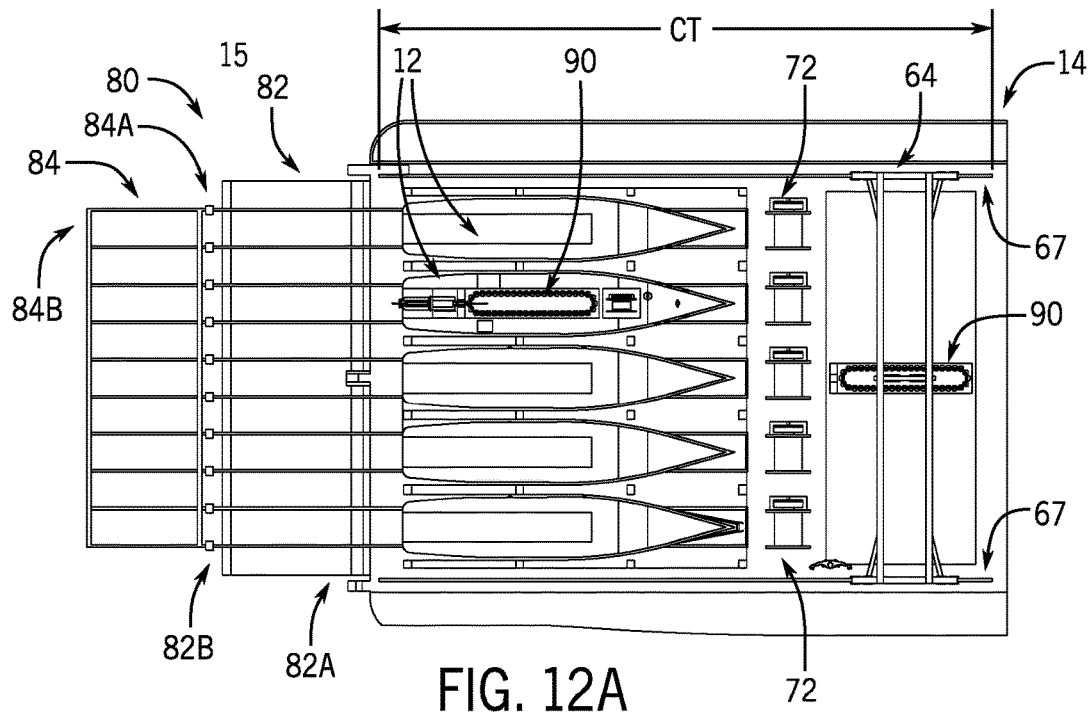
FIG. 12A is a plan view of the deployed ramp and slipway system.
Figure 12B:
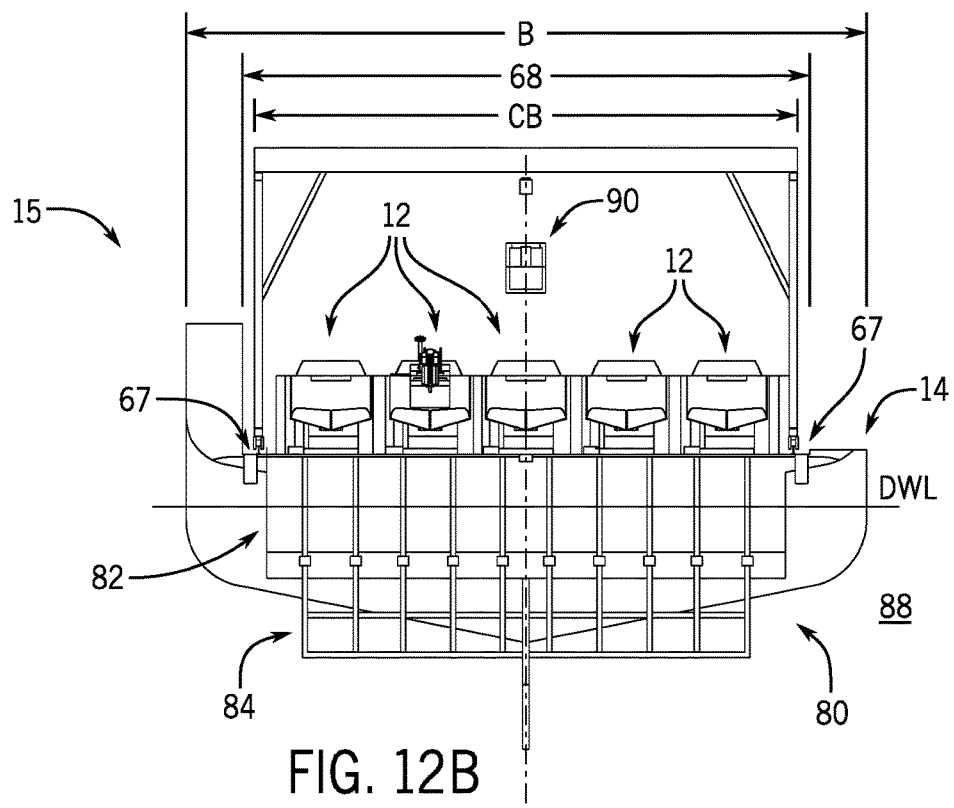
FIG. 12B is an aft view of the deployed ramp and slipway system.

FIG. 12A is a plan view of the ramp and slipway system 80 deployed from the back deck of a seismic vessel 14. FIG. 12B is an aft view of the deployed ramp and slipway system 80.

Figure 13A:
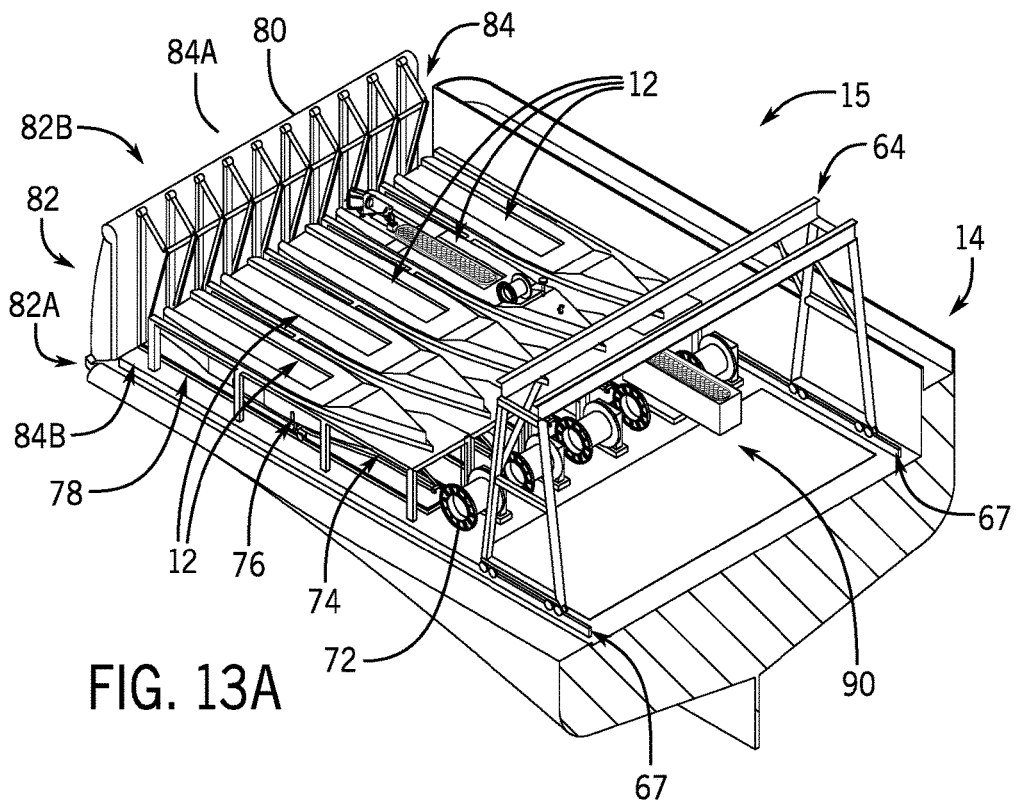
FIG. 13A is an isometric view of the ramp and slipway system, in a raised or stowed position.
Figure 13B:
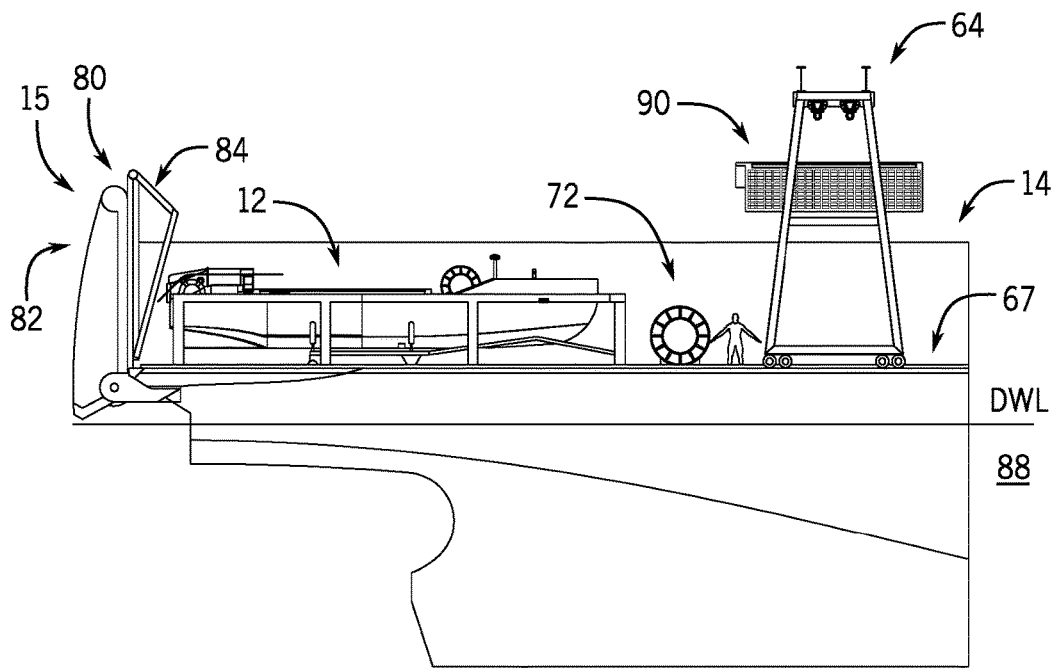
FIG. 13B is a profile view of the stowed ramp and slipway system.

As shown in FIGS. 13A and 13B, the folding ramp 82 and slipway assemblies 84 are provided in an articulated configuration, with the ramp components 82 having a hinged coupling to the back deck of seismic vessel 14 on one end (e.g., the proximal or forward end) 82A, and another hinged coupling to slipways 84 on the opposite (e.g., distal or aft) end 82B. Similarly, the slipways 84 have a hinged coupling on the proximal (forward) end 84A, which couples to the distal end 82B of the ramp members (or ramp assembly) 82. The opposite (distal or aft) end 84B is disposed in the water column, as described above.

The gantry crane 64 and can be mounted to the back deck of a suitable seismic vessel 14 with beam width B, for example with the crane beam width CB disposed between crash rails 68, and configured to provide sufficient crane travel length CT along crane rails 67 for loading and unloading the portable node storage and deployment modules 90 on each seismic vessel 12 in or on the back deck area of seismic vessel 14. Folding ramps 82 and slipways 84 can either be lowered and deployed when loading and unloading the deployment modules 90 as shown (and for performing other service operations on seismic vessels 12), or ramps 82 and slipways 84 can be raised and stowed as described below.

FIG. 13A is a perspective view of the ramp and slipway system 80, in a raised or stowed position on the back deck of a seismic vessel 14. FIG. 13B is a profile view of the stowed ramp and slipway system 80.

As shown in FIGS. 13A and 13B, seismic vessels 12 are disposed in docking platforms 74, e.g., positioned on rails 78 by individual carriages 76. The ramps (or ramp assembly) 82 can be folded upright, with the distal ramp end 82B disposed above the proximal ramp end 82A coupled to the back deck of the seismic vessel 14. Similarly, the slipways (or slipway assembly) 84 can be folded upright against the ramp assembly 82, with the proximal slipway end 84A coupled to the distal ramp end 82B and positioned above the back deck of the seismic vessel 14, with the distal slipway end 84B disposed adjacent the back deck where it couples to proximal ramp end 82A.

FIG. 14A is a plan view of ramp and slipway system 80, in the raised or stowed position. FIG. 14B is an aft view showing a representative arrangement of the gantry crane 64, and FIG. 14C is a detail view of the gantry crane 64.

As shown in FIGS. 14A-14C, gantry crane 44 can be configured to load and unload individual seismic receivers or nodes 16 onto vessels 12 in portable node storage and deployment modules 90. Each module or unit 90 can be provided with a node stacker/destacker or similar loading mechanism 44, and configured for storage and retrieval of seismic nodes 16 using a rack-type magazine storage system 46.

The storage systems 46 and loading mechanisms 44 are removably mounted the hull structure of each selected vessel 12 inside the storage and deployment modules 90. In some embodiments, the nodes 16 can be loaded into columns or magazines which circulate on a carousel operably coupled to the magazine or rack system 46, as described above.

FIG. 15A is an isometric view illustrating an unmanned or autonomous seismic vessel deployment on a ramp and slipway system 80. FIG. 15B is an aft view illustrating the deployment procedure, and FIG. 15C is a section view illustrating the seismic vessel during deployment.

As shown in FIGS. 15A-15C, portable node storage and retrieval modules 90 can be mounted to seismic vessels 12 when disposed in a respective docking platform 74 (vessel position 12A). The tow winch 72 can be operated to deploy individual vessels 12 on their respective carriages 76, which travel up and down along the rails 78 from the docking platform 74 to the ramp 82 (vessel position 12B). The vessel 12 can be lowered down the ramp 82 to the slipway 84 (vessel position 12C), and deployed in the water column 88 defined by the designated water line (DWL).

Figure 16A:
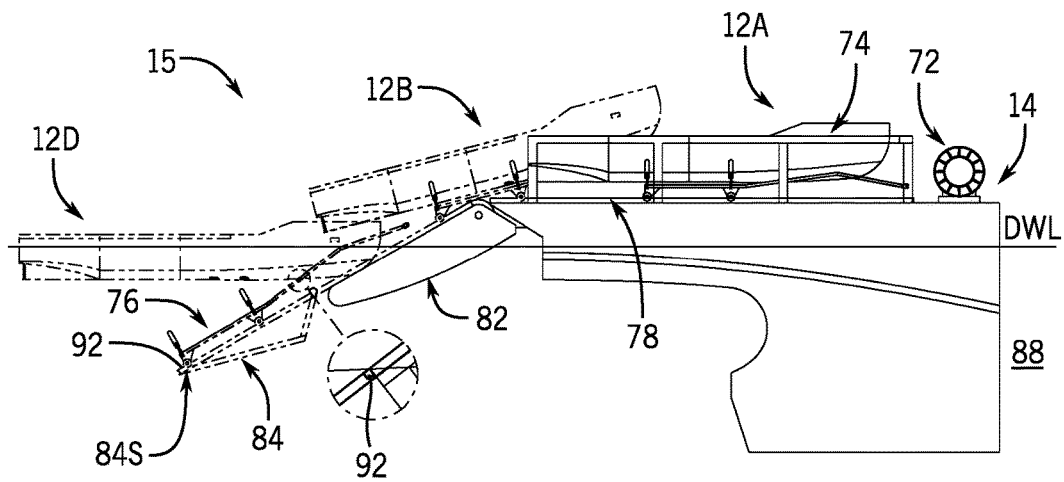
FIG. 16A is an elevation view illustrating seismic vessel retrieval on a ramp and slipway system.
Figure 16B:
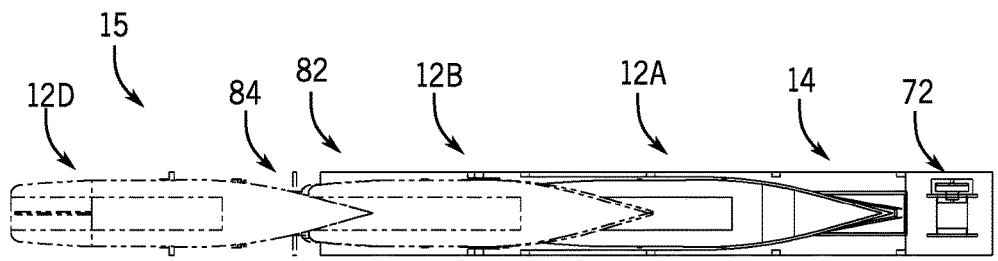
FIG. 16B is a plan view illustrating the seismic vessel retrieval procedure.

FIG. 16A is an elevation view illustrating unmanned or autonomous seismic vessel retrieval using a ramp and slipway system 80. FIG. 16B is a plan view illustrating the retrieval procedure, and FIG. 16C is an isometric view of a carriage apparatus 76 for use when deploying and retrieving the seismic vessels 12.

Figure 16C:
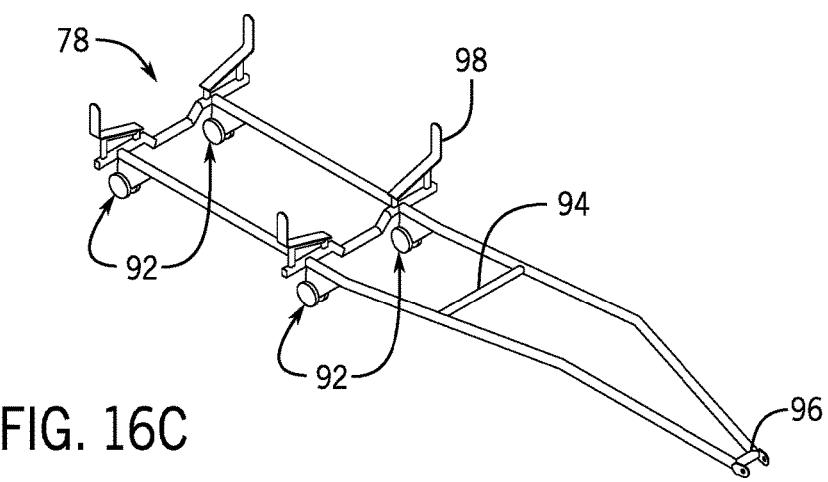
FIG. 16C is an isometric view of a carriage apparatus for deploying and retrieving an unmanned or autonomous seismic vessel.

As shown in FIGS. 16A-16C, upon deployment of the seismic vessel 12, the rear wheels 92 of the carriage 76 are positioned against a stop 84S on the distal (aft) end of the slipway 84. Upon retrieval, the bow or stern of the seismic vessel 12 docks within the slipway 84 and makes contact with the ramp 82 (position 12D), where a transverse beam component 94 of the carriage 76 can engage a protrusion or fitting on the bow or front portion of the keel of the vessel 12.

Once the vessel 12 is docked and engaged to the carriage 76 in the slipway 84 (position 12D), the vessel 12 is retrieved from the water column 88 by towing the carriage 76 and vessel 12 up the ramp 82 (position 12B). This can be accomplished, e.g., using the tow winch 72 and a rope or cable attached to a tow lug 96 on the front of the carriage assembly 76. The carriage 76 then continues up the ramp 82 with the hull of the vessel disposed between the side guards 98, until the vessel 12 and carriage 76 are engaged in their original position within the docking station 74 (position 12A).

While references are made here to embodiments of the invention, it should be understood that the invention is not limited to the specifically described examples. Instead, any combination of the disclosed features and elements, whether related to different embodiments or not, is contemplated to implement and practice the invention. Further, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the disclosed aspects, features, embodiments and advantages are merely illustrative, and are not considered elements or limitations of the claims except where expressly recited. Likewise, reference to the invention shall not be construed as a generalization of any inventive subject matter that is disclosed, and shall not be considered to be an element or limitation of the claims except where stated therein.

While this disclosure is directed to representative embodiments of the invention, therefore, it is understood that changes can be made and equivalents may be substituted to adapt the disclosure to different problems and applications, while remaining within the spirit and scope of the invention as claimed. The invention is thus not limited to the specific examples that are expressly described, but instead encompasses all embodiments and practices falling within the scope of the claims.

EXAMPLES

In various examples and embodiments, an unmanned marine vessel is configured to deploy seismic receivers or nodes. For example, the receivers or nodes may be deployed along a seismic streamer, or in the form of an ocean bottom cable or system of autonomous nodes. The vessel can also be configured to retrieve or recover the receivers and node. Systems and methods for operating the vessel are also encompassed.

In some embodiments, an unmanned marine vessel is configured to deploy seismic receivers or nodes. In addition, the vessel can be further configured to retrieve the receivers or nodes.

In any of the above examples and embodiments, the seismic receivers or nodes can be deployed along a seismic streamer or other towed seismic cable system, along an ocean bottom cable, or as a system of autonomous nodes deployed either on the seabed or at a selected depth and orientation in the water column.

A computer processor can be disposed on an unmanned or autonomous marine vessel according to any of the above examples. For example, the processor can be configured to control the vessel in order to deploy the seismic receivers or nodes, e.g. in the form of one or more seismic streamer cables, or as an ocean bottom cable or a system of autonomous seismic nodes. In additional examples, the processor can be configured to control the vessel to service or recover the seismic receivers or nodes.

Methods of operating an unmanned or autonomous marine vessel are also encompassed, e.g., where the method can be performed to deploy and retrieve one or more seismic receivers or nodes, or for both deployment and retrieval of one or more seismic receivers streamers or nodes. The seismic receivers and nodes can be provided in the form of streamer cables, ocean bottom cables, or autonomous nodes. In additional examples, the methods can be performed to service the receivers or nodes, for example in order to recover data and recharge power supplies.

A non-transitory, computer readable data storage medium can also be provided with program code stored thereon, where the program code is executable on a computer processor to control the unmanned marine vessel in execution of any of the above examples and embodiments.

Additional examples and embodiments include a seismic vessel having a docking or gantry system configured for deployment or one or more unmanned marine vessels, as described in any of the above examples and embodiments. Seismic vessel embodiments are also encompassed, where the vessel incorporates the docking or gantry system.

In unmanned seismic vessel embodiments, the vessel system may comprise a hull system comprising one or more hull components configured to provide buoyancy in a water column, and a storage apparatus mounted to the hull system and configured for storing one or more seismic nodes, each seismic node having at least one seismic sensor configured to acquire seismic data. A deployment system can be configured for deploying the seismic nodes from the storage apparatus to the water column, where the seismic data are responsive to a seismic wavefield propagating therein. A controller can be configured to operate the deployment system, where the seismic nodes are automatically deployed in seismic array.

In any of the above examples and embodiments, the unmanned seismic vessel system can include one or more tow lugs coupled to the hull system, where the hull system is configured for towing through the water column during deployment of the seismic nodes and acquisition of the seismic data. The storage apparatus can comprise a rack or magazine system and a loader mechanism can be configured for loading the seismic nodes into the rack or magazine system and for retrieving the seismic nodes therefrom. The storage apparatus can include a carousel mechanism operably coupled to the rack or magazine system and configured to position the seismic nodes with respect to the loader mechanism.

A winch apparatus can be configured for deploying the seismic nodes along a cable or rope. An automated attachment mechanism can be configured for attaching the seismic nodes to the cable or rope via a clamping mechanism or tether member. A sheave mechanism can be configured for deploying the seismic nodes to the water column, while disposed along the cable or rope.

In autonomous seismic node embodiments, each node can comprise a power supply, memory and a clock configured for automatically acquiring and storing the seismic data and associated timing data. The at least one seismic sensor on each seismic node can comprise at least one hydrophone configured for acquiring a portion of the seismic data as pressure wave data responsive to the seismic wavefield, and at least one geophone configured for acquiring another portion of the seismic data as particle motion data responsive to the seismic wavefield.

In any of the above examples and embodiments, an automated on-board navigational system can be provided, and configured to maintain a course with respect to the water column while the seismic nodes are deployed therein. An automated on-board positioning system can be configured for determining relative position information for the unmanned seismic vessel system with respect to one or more other unmanned seismic vessels by communication therewith, where the course is maintained based at least in part on the relative position information, such that a desired spacing is maintained with respect to the one or more other unmanned seismic vessels.

Suitable method embodiments can include one or more steps of determining positional information for an unmanned seismic vessel, the unmanned seismic vessel comprising a hull system configured to provide buoyancy; navigating the unmanned seismic vessel with respect to a water column, based on the positional information; and deploying the one or more seismic receivers from the hull system to the water column. Each of the seismic receivers can comprise at least one seismic sensor configured to acquire seismic data responsive to a seismic wavefield. The methods can also include providing precision timing information from the unmanned seismic vessel to the deployed seismic receivers; and storing the acquired seismic data, where the seismic data are associated with the precision timing information.

Additional methods can include paying out cable from a winch apparatus mounted on the hull system; unloading the seismic receivers from a magazine mounted to the hull system; and attaching the seismic receivers to the cable, wherein the seismic receivers are deployed into the water column along the cable. Such methods may further comprise one or more of positioning the seismic receivers with respect to the cable via a carousel apparatus operationally coupled to the magazine; recovering the cable from the water column; decoupling the seismic receivers from the cable; and storing the seismic receivers in the magazine. Navigating the unmanned seismic vessel can comprise maintaining a selected depth and spacing of the seismic receivers with respect to other seismic receivers in a seismic array.

In any of the above examples and embodiments, one or more such unmanned seismic vessels can be deployed from a tender vessel, each unmanned seismic vessel having a respective hull system disposed in the water column. Deploying the one or unmanned seismic vessels can comprise one or more of flooding a back deck area of the tender vessel within the water column; positioning the respective hull system in the water column from the flooded back deck area; lowering the respective hull systems from the back deck area of the tender into the water column; and positioning the one or more unmanned seismic vessels with respect to one or more slipways or docking bays, where the respective hull components are lowered into the water column thereby.

Suitable seismic survey system embodiments may comprise a plurality of unmanned seismic vessels deployed in a water column, each unmanned seismic vessel comprising a hull system configured to provide buoyancy and a deployment system configured to deploy seismic nodes into the water column. A plurality of the seismic nodes can be deployed from each unmanned seismic vessel, each of the seismic nodes comprising at least one seismic sensor configured to acquire seismic data. A seismic source can be configured to generate a seismic wavefield propagating through the water column, where the seismic data are responsive to reflections of the seismic wavefield from subsurface structures.

In any of the above examples and embodiments, a navigational control system can be provided on each unmanned seismic vessel. The navigational control system can be configured to maintain a selected spacing between the respective unmanned seismic vessels, for example by communication of respective position and course data therebetween.

The deployment systems can each comprise: a magazine configured to store the seismic nodes on the hull system; a winch configured to deploy cable proximate the magazine; a loading mechanism configured to unload the nodes from the magazine and couple the nodes to the cable; and a deployment unit configured to deploy the cable into the water column with the nodes coupled thereto. Each of the unmanned seismic vessels can comprise a tow lug configured for coupling to a tow line and a generator apparatus configured to power the deployment system, e.g., absent external power connections to the tow ship or other external power source.

In any of the above examples and embodiments, a tender vessel can be provided, e.g., with a back deck area and a docking apparatus having an articulated coupling thereto. The docking apparatus may be provided with a crane configured for deploying the unmanned seismic vessels from the tender vessel to the water column.

A node deployment module can also be provided, e.g., comprising the magazine and the loading mechanism. The node deployment module can be configured for removably mounting the magazine and loading mechanism to the hull system of a selected unmanned seismic vessel, for deployment of the seismic nodes to the water column.

A tender vessel (or other seismic research vessel) may have a docking apparatus configured for deploying the unmanned seismic vessels to the water column, e.g., with an articulated coupling between a back deck area of the seismic vessel and the docking apparatus. The docking apparatus may comprise a slipway and ramp assembly configured for lowering the unmanned seismic vessels into the water column. An articulated coupling can be provided between the slipway and ramp assemblies, and configured for stowing the slipway and ramp assembly in a vertical position with respect to the back deck of the tender vessel. A carriage can be configured for deploying one or more of the seismic vessels from the back deck to the water column, e.g., with the carriage configured to transport the seismic vessel along the ramp assembly to the slipway.

While this disclosure is directed to particular embodiments of the present invention, other examples may also be devised without departing from the basic scope of the invention, for example by substituting various equivalents or adapting the teachings to different materials, problems and applications. The scope of the invention is thus not limited to any particular embodiment, but is instead define by the scope of the appended claims.

The invention claimed is:

1. An unmanned seismic vessel comprising:
   a hull system configured to provide buoyancy;
   a deployment system configured to deploy a seismic node to a water column, wherein the seismic node comprises a power supply, memory, a seismic sensor and a clock configured for acquiring and storing seismic data and associated timing data; and
   a controller configured to operate the deployment system to deploy the seismic node.

2. The unmanned seismic vessel of claim 1, further comprising an automated on-board positioning system configured for determining relative position information for the hull system with respect to one or more other such unmanned seismic vessels.

3. The unmanned seismic vessel of claim 1, further comprising an automated on-board navigational system configured to determine a course of the seismic vessel with respect to the water column.

4. The unmanned seismic vessel of claim 1, further comprising a storage apparatus configured to store a plurality of seismic nodes for deployment to the water column.

5. The unmanned seismic vessel of claim 1, further comprising:
  a propulsion system coupled to the hull system to propel the unmanned seismic vessel through the water column; or
  a tow lug coupled to the hull system, the tow lug configured to couple the unmanned seismic vessel to a tow line for towing through the water column.

6. The unmanned seismic vessel of claim 1, further comprising a cable coupled to the seismic node, wherein the deployment system is configured to pay out the cable to deploy the seismic node to the water column.

7. The unmanned seismic vessel of claim 6, wherein the deployment system comprises a winch or sheave system configured control tension in the cable for deployment to the water column.

8. The unmanned seismic vessel of claim 6, further comprising a plurality of such seismic nodes attached to the cable to acquire seismic data upon deployment system to the water column.

9. The unmanned seismic vessel system of claim 1, wherein a sensor of the seismic node comprises at least one of a hydrophone configured to acquire a portion of the seismic data as pressure wave data responsive to a seismic wavefield or a geophone configured to acquire another portion of the seismic data as particle motion data responsive to the seismic wavefield.

10. A method comprising:
  determining positional information for an unmanned seismic vessel;
  navigating the unmanned seismic vessel with respect to a water column, based on the positional information;
  deploying a seismic receiver from the unmanned seismic vessel to the water column, wherein the seismic receiver comprises a seismic sensor configured to acquire seismic data; and
  providing timing information to the seismic receiver, wherein the seismic receiver associates the seismic data with the timing information.

11. The method of claim 10, further comprising storing the acquired seismic data and timing information in memory.

12. The method of claim 10, further comprising paying out a cable to the water column, wherein the seismic receiver is deployed to the water column along the cable.

13. The method of claim 12, further comprising positioning the seismic receiver adjacent the cable from a magazine or carousel system and attaching the seismic receiver to the cable for deployment to the water column.

14. The method of claim 13, further comprising recovering the cable from the water column, decoupling the seismic receiver from the cable, and storing the seismic receiver in the magazine or carousel system.

15. A seismic survey system comprising:
  a plurality of unmanned seismic vessels deployed in a water column, each unmanned seismic vessel comprising a hull system configured to provide buoyancy and a deployment system configured to deploy seismic nodes to the water column; and
  a plurality of the seismic nodes deployed from each unmanned seismic vessel, each of the seismic nodes comprising a seismic sensor configured to acquire seismic data responsive to a seismic wavefield propagating in the water column.

16. The seismic survey system of claim 15, further comprising a seismic source configured to generate the seismic wavefield, wherein the seismic reflects from subsurface structure below the water column.

17. The seismic survey system of claim 15, wherein one or more of the unmanned seismic vessels comprises:
  a tow lug configured for coupling to a tow line for towing the respective unmanned seismic vessel through the water column; or
  a propulsion system configured to propel the respective unmanned seismic vessel through the water column.

18. The seismic survey system of claim 15, wherein each deployment system comprises:
  a magazine or carousel system configured to store the respective seismic nodes on the respective hull system;
  a winch or sheave system configured to deploy a cable to the water column proximate the respective magazine or carousel system; and
  a loading mechanism configured to unload the respective seismic nodes from the magazine or carousel system for coupling to the cable and deployment to the water column.

19. The seismic survey system of claim 15, wherein one or more of the unmanned seismic vessels comprises a generator configured to power the respective deployment system.

20. The seismic survey system of claim 15, wherein one or more of the unmanned seismic vessels comprises a controller configured to operate the respective deployment system to deploy the respective seismic nodes to the water column and to retrieve respective the seismic nodes from the water column.

21. The seismic survey system of claim 15, wherein one or more of the unmanned seismic vessel comprises an on-board positioning system configured for determining a position of the respective unmanned seismic vessel with respect to others of the unmanned seismic vessels.

* * * * *